(12) United States Patent
Morita et al.

(10) Patent No.: US 12,533,730 B2
(45) Date of Patent: Jan. 27, 2026

(54) ADDITIVE MANUFACTURING APPARATUS AND ADDITIVE MANUFACTURING METHOD

(71) Applicant: Mitsubishi Electric Corporation, Tokyo (JP)

(72) Inventors: Daiji Morita, Tokyo (JP); Nobuyuki Sumi, Tokyo (JP); Hisashi Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/717,531

(22) PCT Filed: Jun. 21, 2022

(86) PCT No.: PCT/JP2022/024755
§ 371 (c)(1),
(2) Date: Jun. 7, 2024

(87) PCT Pub. No.: WO2023/248357
PCT Pub. Date: Dec. 28, 2023

(65) Prior Publication Data
US 2024/0416420 A1    Dec. 19, 2024

(51) Int. Cl.
*B22F 10/22* (2021.01)
*B22F 10/36* (2021.01)
(Continued)

(52) U.S. Cl.
CPC .............. *B22F 10/22* (2021.01); *B22F 10/36* (2021.01); *B22F 12/224* (2021.01); *B33Y 10/00* (2014.12); *B33Y 30/00* (2014.12); *B33Y 50/02* (2014.12)

(58) Field of Classification Search
CPC ........ B22F 10/22; B22F 10/36; B22F 12/224; B33Y 10/00; B33Y 30/00; B33Y 50/02
See application file for complete search history.

(56) References Cited

U.S. PATENT DOCUMENTS

2019/0351509 A1* 11/2019 Kayashima ............ B23K 15/00
2020/0215635 A1    7/2020 Peters et al.
(Continued)

FOREIGN PATENT DOCUMENTS

DE    11 2020 007 082 T5    2/2023
DE    11 2020 007 111 T5    3/2023
(Continued)

OTHER PUBLICATIONS

International Search Report and Written Opinion mailed on Aug. 2, 2022, received for PCT Application PCT/JP2022/024755, filed on Jun. 21, 2022, 8 pages including English Translation.
(Continued)

*Primary Examiner* — Rebecca Janssen
(74) *Attorney, Agent, or Firm* — XSENSUS LLP

(57) ABSTRACT

An additive manufacturing apparatus includes: a machining head; a beam nozzle through which a beam emitted from the machining head passes; a material feed unit that feeds a material to a workpiece; a first drive unit that moves a tip portion of the material relative to the workpiece; a second drive unit that moves the beam in a direction included in a reference plane perpendicular to a central axis of the beam nozzle; and a controller that determines, on the basis of a direction of travel, a direction of the movement of the beam, the direction of travel being included in the reference plane, the direction of travel being a direction in which the tip portion travels relative to the workpiece, and controls the first and second drive units such that the beam is movable in a manner different from movement of the tip portion relative to the workpiece.

8 Claims, 20 Drawing Sheets

(51) Int. Cl.
    *B22F 12/00*     (2021.01)
    *B33Y 10/00*     (2015.01)
    *B33Y 30/00*     (2015.01)
    *B33Y 50/02*     (2015.01)

(56) References Cited

U.S. PATENT DOCUMENTS

| | | | |
|---|---|---|---|
| 2021/0308794 A1* | 10/2021 | Hattori | B33Y 30/00 |
| 2021/0308796 A1 | 10/2021 | Morita et al. | |
| 2022/0051692 A1 | 2/2022 | Urahama | |
| 2022/0176483 A1 | 6/2022 | Peters et al. | |
| 2023/0061492 A1 | 3/2023 | Franzosi et al. | |

FOREIGN PATENT DOCUMENTS

| | | | |
|---|---|---|---|
| JP | H06-015890 U | 3/1994 | |
| JP | 2000-005888 A | 1/2000 | |
| JP | 2000-317666 A | 11/2000 | |
| JP | 2001-058285 A | 3/2001 | |
| JP | 2019-155376 A | 9/2019 | |
| JP | 2020-108905 A | 7/2020 | |
| JP | 2020-135905 A | 8/2020 | |
| JP | 2020-179418 A | 11/2020 | |
| JP | 2022-032283 A | 2/2022 | |
| WO | 2019/198212 A1 | 10/2019 | |
| WO | 2020/084715 A1 | 4/2020 | |
| WO | WO-2021150691 A1 * | 7/2021 | B22F 10/25 |

OTHER PUBLICATIONS

Notice of Reason for Refusal mailed on Dec. 20, 2022, received for JP Application 2022-560844, 12 pages including English Translation.

Notice of Reason for Refusal mailed on May 9, 2023, received for JP Application 2022-560844, 6 pages including English Translation.

Decision to Grant mailed on Aug. 8, 2023, received for JP Application 2022-560844, 5 pages including English Translation.

Office Action issued on Nov. 28, 2024, in corresponding Chinese patent Application No. 202280085512.5, 14 pages.

Office Action issued May 12, 2025 in corresponding German Application No. 11 2022 004 908.1.

* cited by examiner 12  5  40

ADDITIVE MANUFACTURING APPARATUS AND ADDITIVE MANUFACTURING METHOD

CROSS-REFERENCE TO RELATED APPLICATION

This application is a national stage application, pursuant to 35 U.S.C. § 371, of International Patent Application No. PCT/JP2022/024755, filed Jun. 21, 2022, the entire contents of which are incorporated herein by reference.

FIELD

The present disclosure relates to an additive manufacturing apparatus and an additive manufacturing method for manufacturing a three-dimensional object.

BACKGROUND

As one of technologies for manufacturing a three-dimensional object, an additive manufacturing (AM) technology is known. According to a directed energy deposition (DED) method, which is one of a plurality of methods in the additive manufacturing technology, an additive manufacturing apparatus forms a bead by irradiating a material and a workpiece with a beam while feeding the material to a command position. The bead is a solidified object obtained when a melted material is solidified on the workpiece. The additive manufacturing apparatus manufactures an object by successively stacking the beads.

Patent Literature 1 discloses an additive manufacturing apparatus that uses the DED method to manufacture an object by feeding a wire as a metal material to a workpiece.

CITATION LIST

Patent Literature

Patent Literature 1: Japanese Patent Application Laid-open No. 2022-32283

SUMMARY OF INVENTION

Problem to be Solved by the Invention

In the additive manufacturing apparatus, when melting of the workpiece is insufficient, the wire may come into contact with the insufficiently melted portion of the workpiece and result in having a defect such as bending of the wire. The likelihood of having such a defect changes depending on the direction in which a tip portion of the wire on the workpiece side is moved. The conventional additive manufacturing apparatus disclosed in Patent Literature 1 does not adjust the beam in response to the change in the direction in which the tip portion of the wire is moved, thereby having had a problem that it may be difficult to achieve stable machining by mitigating the defect.

The present disclosure has been made in view of the above, and an object thereof is to provide an additive manufacturing apparatus capable of achieving stable machining.

Means to Solve the Problem

To solve the problem and achieve the object, an additive manufacturing apparatus according to the present disclosure is an additive manufacturing apparatus that manufactures an object by adding a material melted by irradiation with a beam to a workpiece, the additive manufacturing apparatus comprising: a machining head; a beam nozzle through which the beam emitted from the machining head passes; a material feed unit to feed the material to the workpiece; a first drive unit to move a tip portion of the material relative to the workpiece, the tip portion being on a side of the workpiece; a second drive unit to move the beam in a direction included in a reference plane, the reference plane being a plane perpendicular to a central axis of the beam nozzle; and a controller to determine, on the basis of a direction of travel, the direction in which the beam is moved by the second drive unit, the direction of travel being included in the reference plane, the direction of travel being a direction in which the tip portion travels relative to the workpiece, and to control the first drive unit and the second drive unit such that the beam is movable in a manner different from movement of the tip portion relative to the workpiece.

Effects of the Invention

The additive manufacturing apparatus according to the present disclosure has an effect of achieving stable machining.

DESCRIPTION OF EMBODIMENTS

Hereinafter, an additive manufacturing apparatus and an additive manufacturing method according to embodiments will be described in detail with reference to the drawings.

First Embodiment

Figure 1:
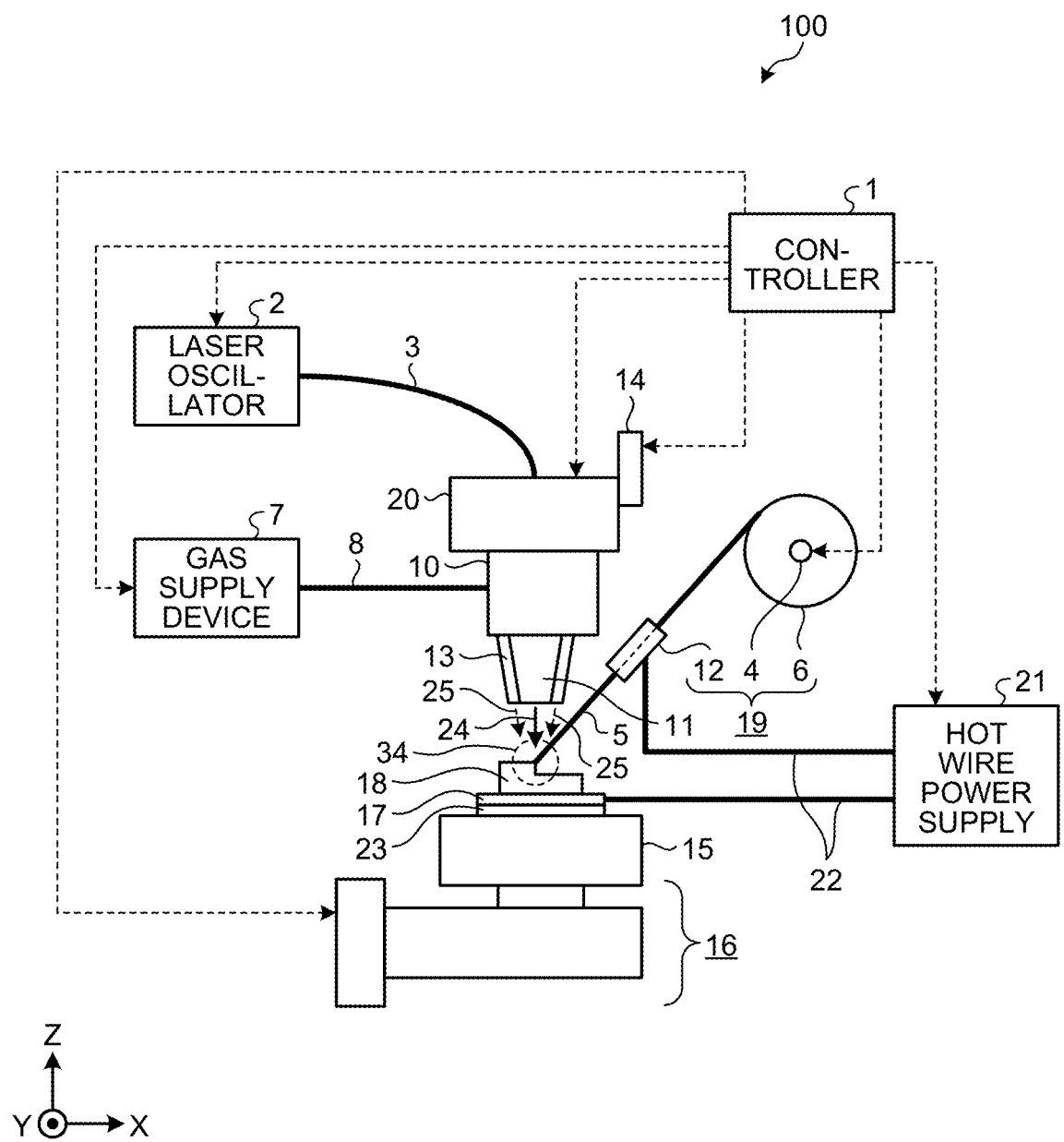
FIG. 1 is a diagram illustrating an example of a configuration of an additive manufacturing apparatus according to a first embodiment.

FIG. 1 is a diagram illustrating an example of a configuration of an additive manufacturing apparatus 100 according to a first embodiment. The additive manufacturing apparatus 100 is a machine tool that manufactures an object by adding, to a workpiece, a material melted by irradiation with a beam. In the first embodiment, the beam is a laser beam 24, and the material is a wire 5 made of metal.

The additive manufacturing apparatus 100 is an additive manufacturing apparatus using a DED method. The additive manufacturing apparatus 100 forms a bead by irradiating the wire 5 and the workpiece with the laser beam 24 while feeding the wire 5 to a command position. On a substrate 17, a plurality of the beads is placed to form a layer of the beads. The layers of the beads are stacked to form a deposit 18 of the beads. By stacking the beads as described above, the additive manufacturing apparatus 100 manufactures a three-dimensional object. The substrate 17 illustrated in FIG. 1 is a plate material. The substrate 17 may be something other than the plate material. The workpiece is an object to which the melted material is added, and is the substrate 17 or the deposit 18.

An X axis, a Y axis, and a Z axis are three axes perpendicular to one another. The X axis and the Y axis are two axes in a horizontal direction. The Z axis direction is a vertical direction. Along the X axis direction, a direction of an arrow is set as a positive X direction, and a direction opposite to the positive X direction is set as a negative X direction. Along the Y axis direction, a direction of an arrow is set as a positive Y direction, and a direction opposite to the positive Y direction is set as a negative Y direction. Along the Z axis direction, a direction of an arrow is set as a positive Z direction, and a direction opposite to the positive Z direction is set as a negative Z direction.

A laser oscillator 2 as a beam source outputs the laser beam 24. The laser beam 24 output from the laser oscillator 2 propagates to a beam drive unit 20 through a fiber cable 3 as an optical transmission line. The beam drive unit 20 is attached to a machining head 10. Details of the beam drive unit 20 will be described later. The laser beam 24 passes through the beam drive unit 20 and enters the machining head 10. Inside the machining head 10, an optical system such as a collimating optical system or a condensing optical system is disposed. The optical system is not illustrated. The laser oscillator 2, the fiber cable 3, and the machining head 10 form an irradiation unit that irradiates the workpiece with the laser beam 24.

The machining head 10 is provided with a beam nozzle 11 through which the laser beam 24 emitted from the machining head 10 passes, and a gas nozzle 13 that ejects a shielding gas. A central axis of the beam nozzle 11 coincides with an optical axis of the optical system. The laser beam 24 passes through the optical system inside the machining head 10 and exits the machining head 10 through the beam nozzle 11. The laser beam 24 propagates from the beam nozzle 11 toward the workpiece. The laser beam 24 is a heat source that melts the wire 5.

The gas nozzle 13 ejects an inert gas 25 as the shielding gas toward a machining area 34 where machining is performed. The ejection of the inert gas 25 reduces oxidation of the bead and cools the bead that has been formed. A gas supply device 7 supplies the inert gas 25. The inert gas 25 is supplied from the gas supply device 7 to the gas nozzle 13 through a pipe 8.

A direction of the central axis of the beam nozzle 11 coincides with the Z axis direction. In the example of the configuration illustrated in FIG. 1, a central axis of the gas nozzle 13 coincides with the central axis of the beam nozzle 11. That is, the gas nozzle 13 is placed coaxially with the beam nozzle 11. The gas nozzle 13 ejects the inert gas 25 vertically downward. Note that the central axis of the gas nozzle 13 may be tilted with respect to the central axis of the beam nozzle 11. In this case, the gas nozzle 13 ejects the inert gas 25 obliquely downward.

A wire spool 6 as a source of the wire 5 is attached to the additive manufacturing apparatus 100. The wire 5 is wound around the wire spool 6. The wire spool 6 turns with the driving of a rotary motor 4 as a servomotor. When the wire spool 6 turns, the wire 5 is paid out from the wire spool 6. The wire 5 paid out from the wire spool 6 passes through a wire nozzle 12 and is fed to the workpiece. The wire 5 is thus fed to an irradiation position of the laser beam 24. Moreover, when the rotary motor 4 is rotated in a direction reverse to that in paying out the wire 5, the wire 5 being paid out is pulled back. The wire 5 is thus withdrawn from the irradiation position of the laser beam 24. The rotary motor 4, the wire spool 6, and the wire nozzle 12 form a material feed unit 19 that feeds the material to the workpiece. The material feed unit 19 feeds the wire 5 such that a tip portion of the wire 5 coincides with a machining point set by a command. The machining point is a position on a machining path.

Note that the wire nozzle 12 may be provided with an operation mechanism for paying out the wire 5 from the wire spool 6. The additive manufacturing apparatus 100 is provided with at least either the rotary motor 4 or the operation mechanism of the wire nozzle 12, thereby feeding the wire 5 to the workpiece. FIG. 1 omits the illustration of the operation mechanism of the wire nozzle 12.

In the example of the configuration illustrated in FIG. 1, a central axis of the wire 5 fed from the wire nozzle 12 is tilted with respect to the central axis of the beam nozzle 11. A direction of the central axis of the wire 5 is an oblique direction between the Z axis direction and the X axis direction.

The wire nozzle 12 is fixed to the machining head 10. FIG. 1 omits the illustration of an element for fixing the wire nozzle 12 to the machining head 10. The beam nozzle 11, the wire nozzle 12, and the gas nozzle 13 are integrated with the machining head 10, so that the positional relationship among the beam nozzle 11, the wire nozzle 12, and the gas nozzle 13 is uniquely determined. That is, relative positions of the beam nozzle 11, the wire nozzle 12, and the gas nozzle 13 are fixed.

A head drive unit 14 moves the machining head 10 in each of the X axis direction, the Y axis direction, and the Z axis direction. The head drive unit 14 includes an operation mechanism that causes the machining head 10 to perform translational motion in each of the three axial directions. The head drive unit 14 includes a servomotor that moves the machining head 10 in the X axis direction, a servomotor that moves the machining head 10 in the Y axis direction, and a servomotor that moves the machining head 10 in the Z axis direction. The illustration of the servomotors is omitted.

The additive manufacturing apparatus 100 moves the machining head 10 with respect to the workpiece to move the irradiation position of the laser beam 24. The additive manufacturing apparatus 100 may move a stage 15 with respect to the machining head 10 to move the irradiation position of the laser beam 24. In this case, the additive manufacturing apparatus 100 moves the stage 15 with respect to the machining head 10 by moving the stage 15 in at least one of the three axial directions.

The relative positions of the beam nozzle 11 and the wire nozzle 12 are fixed so that, in conjunction with the movement of the irradiation position by the driving of the head drive unit 14, the tip portion of the wire 5 is also moved. The head drive unit 14 is a first drive unit that moves the tip portion of the wire 5 on the workpiece side with respect to the workpiece. In the case where the stage 15 is moved with respect to the machining head 10, the stage 15 is the first drive unit.

A rotation mechanism 16 is an operation mechanism that enables rotation of the stage 15 about a first axis and rotation of the stage 15 about a second axis perpendicular to the first axis. In the rotation mechanism 16 illustrated in FIG. 1, the first axis is an axis parallel to the X axis, and the second axis is an axis parallel to the Y axis. The rotation mechanism 16 includes a servomotor that causes the stage 15 to rotate about the first axis, and a servomotor that causes the stage 15 to rotate about the second axis. By the driving of the servomotors, the rotation mechanism 16 causes the stage 15 to perform rotational motion about each of the two axes. The illustration of the servomotors is omitted.

The additive manufacturing apparatus 100 causes the stage 15 to rotate using the rotation mechanism 16, thereby changing a posture of the workpiece. The additive manufacturing apparatus 100 can change the posture of the workpiece to a posture suitable for machining.

The additive manufacturing apparatus 100 includes a hot wire power supply 21, current cables 22, and an insulator 23. The hot wire power supply 21 is a power supply that generates a high current of about 200 A to 500 A. One of the current cables 22 connects the hot wire power supply 21 and the wire nozzle 12. Another one of the current cables 22 connects the hot wire power supply 21 and the substrate 17. When the current from the hot wire power supply 21 flows to the wire nozzle 12 through the current cable 22, the current flows to the wire 5 in contact with the wire nozzle 12. Note that the stage 15 and the substrate 17 are insulated from each other by the insulator 23.

The wire 5 has electrical resistance so that, when the current flows through the wire 5, Joule heat is generated in the wire 5. The temperature of the wire 5 is increased by Joule heat. In this case, the laser beam 24 and Joule heat serve as the heat source that melts the wire 5. In the additive manufacturing apparatus 100, Joule heat is added to the heating by the laser beam 24 to accelerate the melting of the wire 5, and the machining speed can be increased. In order to increase the machining speed, it is desirable to heat the wire 5 to the vicinity of the melting point of the wire 5 by Joule heat.

The beam drive unit 20, which is a second drive unit, moves the laser beam 24 in a direction included in a reference plane. The reference plane, which is a virtual plane, is a plane perpendicular to the central axis of the beam nozzle 11. The reference plane is an XY plane. For example, the reference plane is set on the basis of a coordinate system of the additive manufacturing apparatus 100. The beam drive unit 20 includes an operation mechanism that moves the laser beam 24 in the direction included in the reference plane.

The beam drive unit 20 includes, for example, a galvanometer scanner that moves the laser beam 24 in the X axis direction and a galvanometer scanner that moves the laser beam 24 in the Y axis direction. The galvanometer scanner includes a mirror for deflecting the laser beam 24. The galvanometer scanner moves the laser beam 24 by rotating the mirror within the range of a specific scan angle. Alternatively, the beam drive unit 20 includes a condenser lens for condensing the laser beam 24, and moves the laser beam 24 by moving the condenser lens in the X axis direction and the Y axis direction. The beam drive unit 20 may have any configuration not limited to the above configuration.

The additive manufacturing apparatus 100 includes a controller 1 that performs overall control on the additive manufacturing apparatus 100. The controller 1 controls the additive manufacturing apparatus 100 according to a machining program. The controller 1 is, for example, a numerical control (NC) device. In the first embodiment, the machining program is an NC program.

The NC program specifies the machining path. The controller 1 analyzes the machining path on the basis of the NC program. The controller 1 generates various commands according to the machining path and machining conditions set for machining. The controller 1 generates a position command that is an interpolation point group for each unit time on the machining path. The controller 1 outputs the position command to the head drive unit 14, thereby controlling the head drive unit 14.

The controller 1 generates a beam output command that is a command based on a condition of beam intensity. The controller 1 outputs the beam output command to the laser oscillator 2, thereby controlling the laser oscillator 2. The controller 1 generates a material feed command that is a command based on a condition of a feed of the wire 5. The controller 1 outputs the material feed command to the rotary motor 4, thereby controlling the rotary motor 4. The material feed command may be a command based on a condition of a feed rate of the wire 5. The feed rate is a rate at which the wire 5 is fed from the wire spool 6 toward the machining point. The feed rate represents the feed of the material per hour.

The controller 1 generates a gas supply command that is a command based on a condition of a supply of the gas. The controller 1 outputs the gas supply command to the gas supply device 7, thereby controlling the amount of the inert gas 25 supplied from the gas supply device 7 to the gas nozzle 13. The controller 1 generates a rotation command that causes the workpiece to be in the posture suitable for machining. The controller 1 outputs the rotation command to the rotation mechanism 16, thereby controlling the rotation mechanism 16.

The controller 1 generates a beam move command that is a command for moving the laser beam 24. The controller 1 outputs the beam move command to the beam drive unit 20, thereby controlling the beam drive unit 20. The controller 1 generates a current command for heating the wire 5 to a desired temperature. The controller 1 outputs the current command to the hot wire power supply 21, thereby controlling the hot wire power supply 21.

The controller 1 determines, on the basis of a direction of travel of the tip portion of the wire 5, a direction in which the laser beam 24 is moved, and controls the head drive unit 14, i.e., the first drive unit and the beam drive unit 20, i.e., the second drive unit such that the laser beam 24 can be moved is movable in a manner different from the movement of the tip portion of the wire 5 relative to the workpiece. The direction of travel, which is included in the reference plane, is a direction in which the tip portion of the wire 5 travels relative to the workpiece. The movement of the laser beam 24 in the manner different from the movement of the tip portion of the wire 5 means that, aside from the movement of the laser beam 24 with the tip portion of the wire 5 by the movement of the machining head 10, the laser beam 24 moves with respect to the tip portion of the wire 5.

As described above, since the wire nozzle 12 is integrated with the machining head 10, the direction of travel of the tip portion of the wire 5 is also the direction in which the machining head 10 travels with respect to the workpiece. The controller 1 controls the head drive unit 14 by regarding the direction of travel of the machining head 10 as the direction of travel of the tip portion of the wire 5. That is, it can also be said that the controller 1 determines the direction in which the laser beam 24 is moved on the basis of the direction of travel of the machining head 10.

Figure 2:
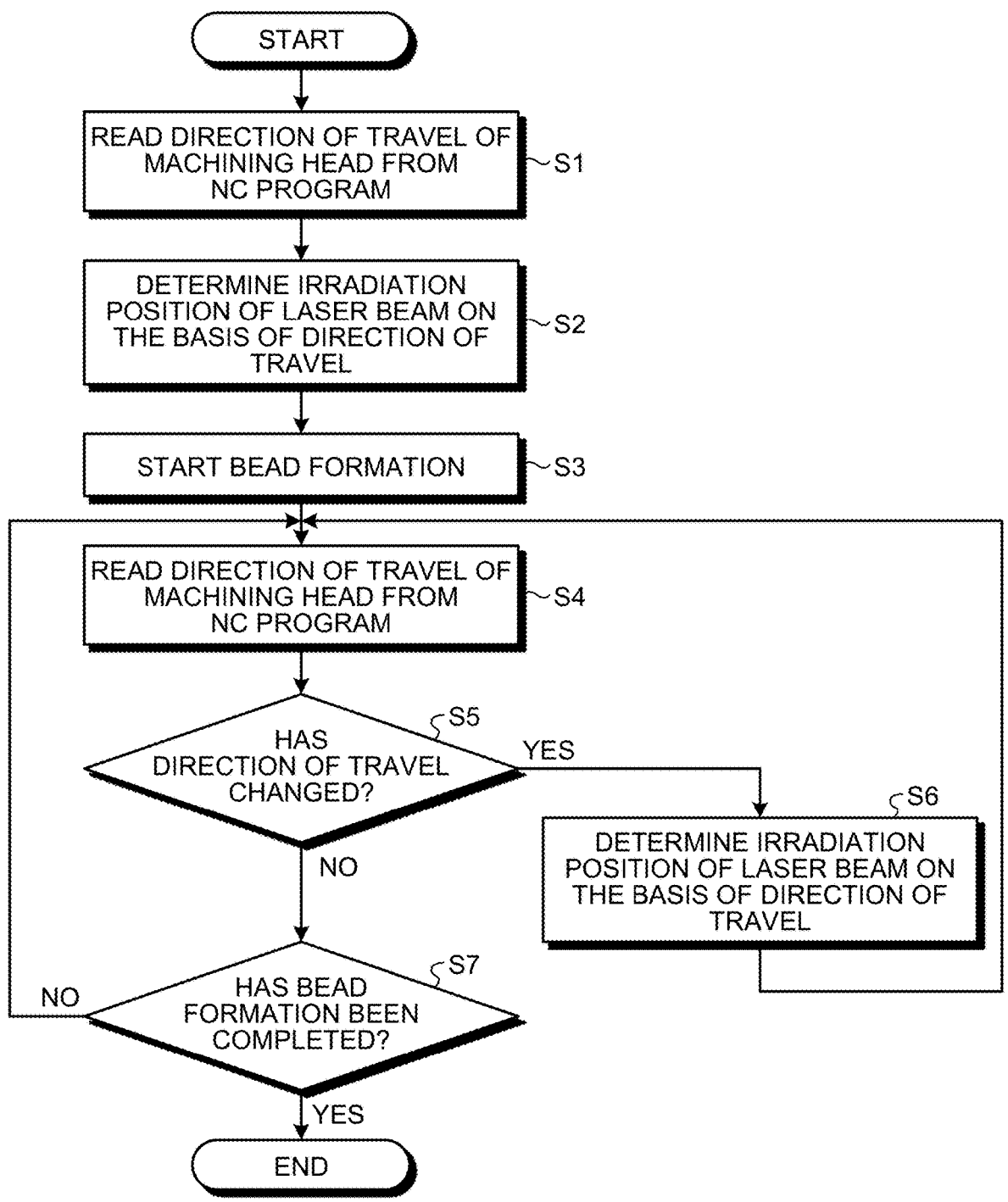
FIG. 2 is a flowchart illustrating an example of an operation procedure of the additive manufacturing apparatus according to the first embodiment.

Next, the operation of the additive manufacturing apparatus 100 will be described. FIG. 2 is a flowchart illustrating an example of an operation procedure of the additive manufacturing apparatus 100 according to the first embodiment.

In step S1, the controller 1 of the additive manufacturing apparatus 100 reads the direction of travel of the machining head 10 from the NC program. The controller 1 analyzes the machining path on the basis of the NC program. The controller 1 obtains the direction of travel of the machining head 10 for each machining point that is a position corresponding to each control cycle in the machining path.

In step S2, the controller 1 determines the irradiation position of the laser beam 24 on the basis of the direction of travel read in step S1. A method of determining the irradiation position will be described later.

In step S3, the additive manufacturing apparatus 100 sets the position of the laser beam 24 at the irradiation position determined in step S2 and starts the formation of a bead. In step S4, the controller 1 of the additive manufacturing apparatus 100 reads the direction of travel of the machining head 10 from the NC program.

In step S5, the controller 1 determines whether or not the direction of travel of the machining head 10 has changed. The controller 1 determines whether or not the direction of travel read in step S4 has changed from the direction of travel read in step S1. If determining in step S5 that the direction of travel has not changed (No in step S5), the additive manufacturing apparatus 100 proceeds to step S7 of the procedure.

On the other hand, if determining in step S5 that the direction of travel has changed (Yes in step S5), in step S6, the controller 1 determines the irradiation position of the laser beam 24 on the basis of the direction of travel read in step S4. The additive manufacturing apparatus 100 sets the position of the laser beam 24 at the irradiation position determined in step S6 and continues the formation of the bead. After completing step S6, the additive manufacturing apparatus 100 returns to step S4 of the procedure.

In step S7, the controller 1 determines whether or not the formation of the bead started in step S3 has been completed. If the formation of the bead has not been completed (No in step S7), the additive manufacturing apparatus 100 returns to step S4 of the procedure. On the other hand, if the formation of the bead has been completed (Yes in step S7), the additive manufacturing apparatus 100 ends the operation according to the procedure illustrated in FIG. 2. The additive manufacturing apparatus 100 forms each of the beads making up an object by the operation according to the procedure illustrated in FIG. 2.

The additive manufacturing apparatus 100 determines the irradiation position of the laser beam 24 before the direction of travel of the machining head 10 changes, and changes the irradiation position of the laser beam 24 to coincide with the timing at which the direction of travel of the machining head 10 changes. Therefore, the controller 1 always performs read-ahead on the NC program to determine the irradiation position of the laser beam 24. In the analysis of the NC program, read-ahead refers to performing analysis on processing that is to be executed after processing currently executed.

The speed of the machining head 10 at the time of forming the bead is, for example, about 300 mm/min to 3000 mm/min. In a case where the irradiation position of the laser beam 24 is changed every 1 mm in the machining path, the controller 1 performs control to change the irradiation position of the laser beam 24 at intervals of approximately 20 msec.

Note that the controller 1 may set the irradiation position of the laser beam 24 in advance with respect to the machining path generated by a computer aided manufacturing (CAM) device, and change the irradiation position on the basis of the setting. For example, in a case where it is difficult to control the irradiation position of the laser beam 24 at intervals of approximately 20 msec while reading the direction of travel of the machining head 10 from the NC program, the controller 1 can properly change the irradiation position by setting the irradiation position in advance.

Figure 3:
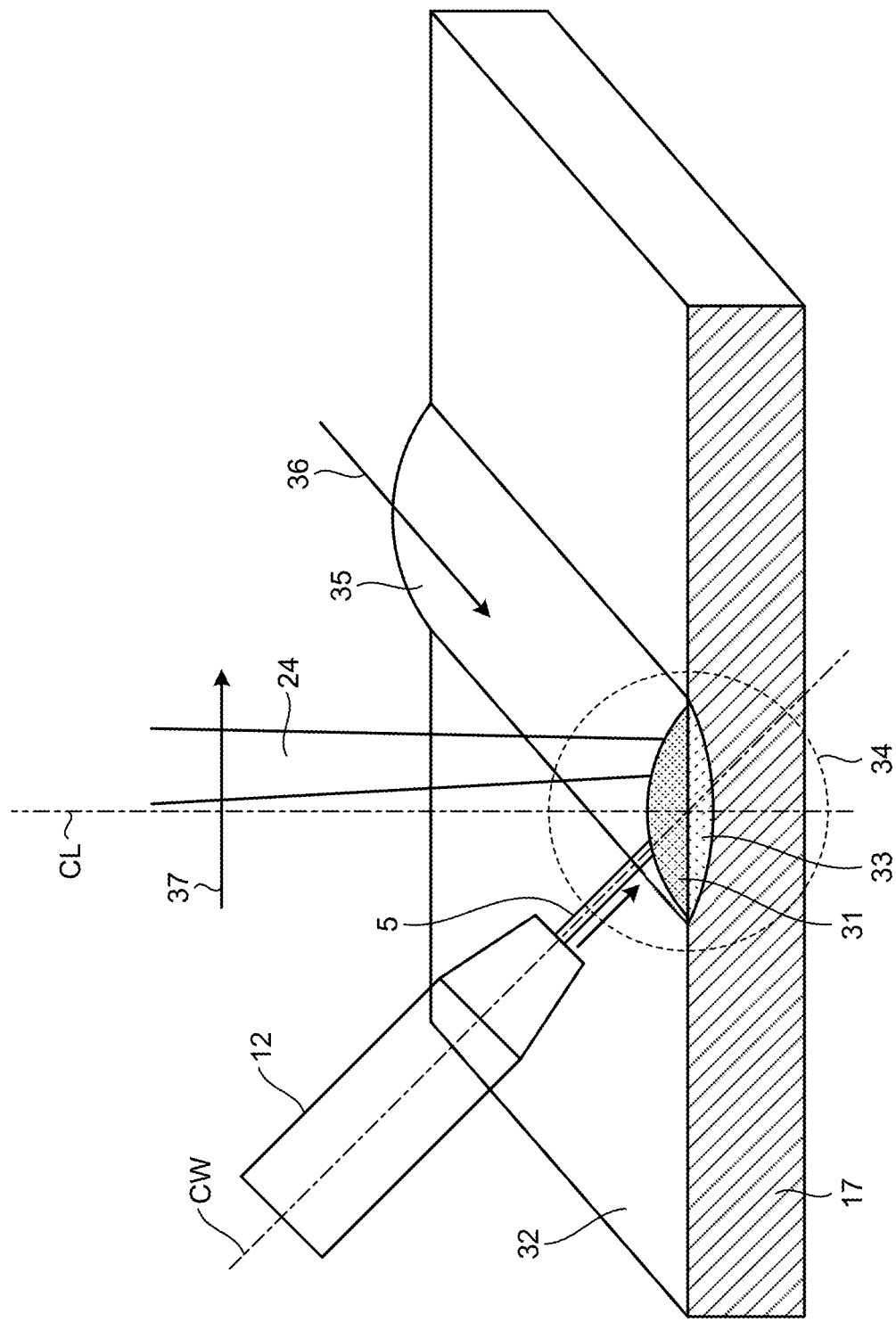
FIG. 3 is a diagram illustrating how an object is formed by the additive manufacturing apparatus according to the first embodiment.

FIG. 3 is a diagram illustrating how an object is formed by the additive manufacturing apparatus 100 according to the first embodiment. FIG. 3 schematically illustrates how a bead 35 is formed on the substrate 17 that is the workpiece. The machining area 34 is an area where machining is performed, and is an area centered on the machining point. In FIG. 3, the machining point is a position on a surface 32 of the substrate 17, and is an intersection of a central axis CL of the beam nozzle 11 and a central axis CW of the wire 5 fed from the wire nozzle 12. FIG. 3 omits the illustration of the beam nozzle 11. The irradiation with the laser beam 24 occurs within the machining area 34. The wire 5 is fed to the machining point.

By the irradiation with the laser beam 24, a molten pool 33 is formed in a part of the surface 32 within the machining area 34. A melt 31 of the wire 5 is placed on the molten pool 33. The melt 31 and the molten pool 33 are integrated together and solidified to form the bead 35 joined to the substrate 17.

An arrow 36 indicates the direction of travel of the machining head 10. When the bead 35 is formed as the machining head 10 is moved in the direction of the arrow 36, the bead 35 having a linear shape whose longitudinal direction coincides with the direction of the arrow 36 is formed on the substrate 17. An arrow 37 indicates a direction in which the laser beam 24 is moved. In the example illustrated in FIG. 3, the direction in which the laser beam 24 is moved is a direction perpendicular to the direction of travel of the machining head 10. In FIG. 3, the irradiation position of the laser beam 24 is a position shifted from the machining point in the direction of the arrow 37.

Figure 4:
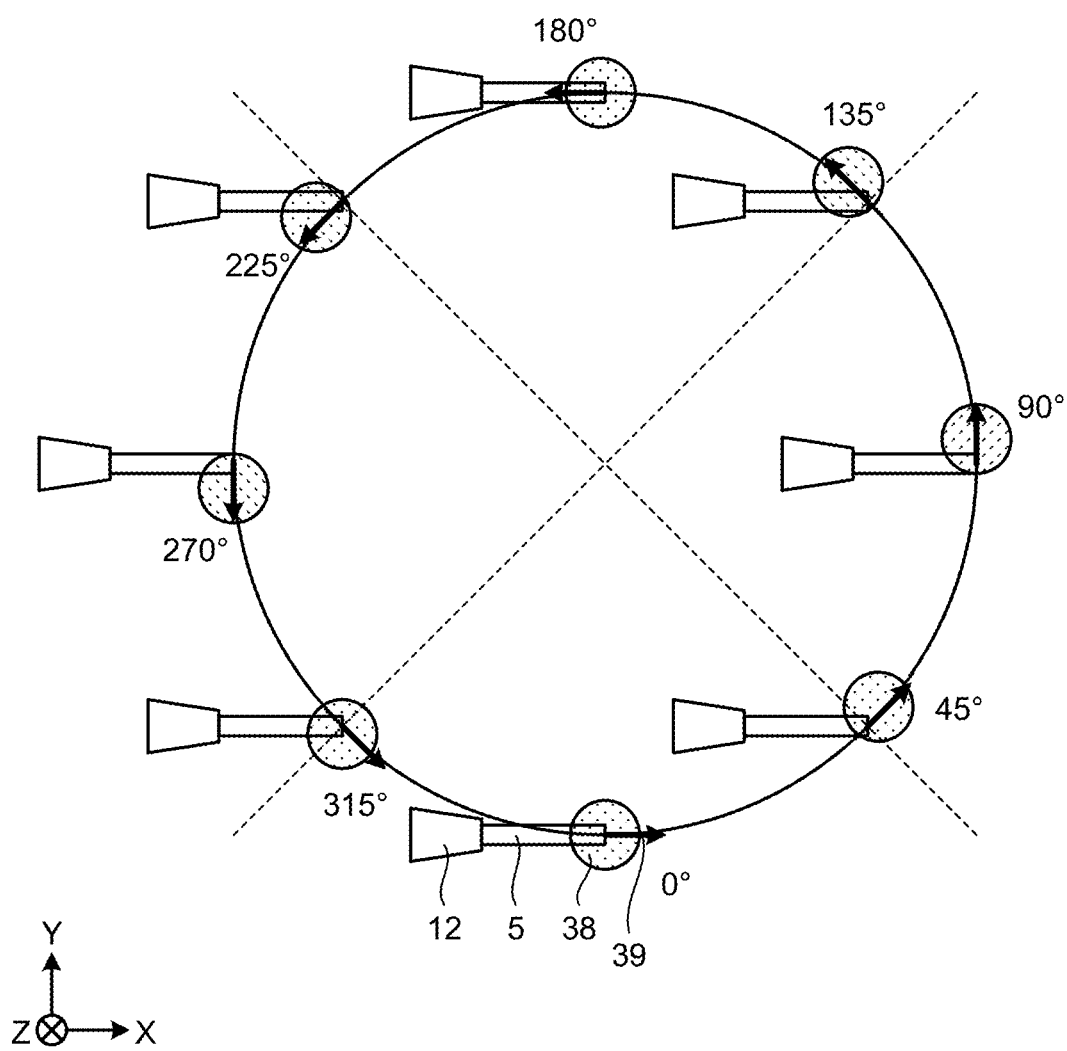
FIG. 4 is a diagram for explaining movement of a laser beam in the additive manufacturing apparatus according to the first embodiment.

Next, the movement of the laser beam 24 by the beam drive unit 20 will be described in detail. FIG. 4 is a diagram for explaining the movement of the laser beam 24 in the additive manufacturing apparatus 100 according to the first embodiment.

In FIG. 4, angles such as 0°, 45°, . . . , and 315° indicate the direction of travel of the machining head 10. The angle indicating the direction of travel of the machining head 10 is relative to the positive X direction. A spot 38 is a cross section of the laser beam 24 in the reference plane. An arrow 39 indicates the direction in which the laser beam 24 is moved. FIG. 4 illustrates how the irradiation position of the laser beam 24 is changed according to the direction of travel of the machining head 10.

When the direction of travel is 0° and when the direction of travel is 180°, the center of the spot 38 coincides with the position of the tip portion of the wire 5. When the direction of travel is other than 0° or 180°, the center of the spot 38 shifts forward in the direction of travel. During a gradual change in the direction of travel from 0° to 90° via 45°, the direction of the arrow 39, that is, the direction in which the spot 38 is shifted gradually changes from the positive X direction to the positive Y direction. Moreover, the amount of shift of the center of the spot 38 from the tip portion of the wire 5 gradually increases from zero. When the direction of travel is 90°, the amount of shift is maximized.

During a gradual change in the direction of travel from 90° to 180° via 135°, the direction in which the spot 38 is shifted changes from the positive Y direction to the negative X direction. Moreover, the amount of shift gradually decreases from the maximum value of the amount of shift. When the direction of travel is 180°, the amount of shift is zero.

During a gradual change in the direction of travel from 180° to 270° via 225°, the direction in which the spot 38 is shifted changes from the negative X direction to the negative Y direction. Moreover, the amount of shift gradually increases from zero. When the direction of travel is 270°, the amount of shift is maximized. During a gradual change in the direction of travel from 2700 to 360°, that is, 0° via 315°, the direction in which the spot 38 is shifted changes from the negative Y direction to the positive X direction. Moreover, the amount of shift gradually decreases from the maximum value of the amount of shift. When the direction of travel is 0°, the amount of shift is zero.

In the controller 1, as described above, the relationship between the direction of travel of the machining head 10 and the direction in which the laser beam 24 is moved is set in advance. On the basis of such a relationship, the controller 1 obtains, from the direction of travel of the machining head 10, the direction in which the laser beam 24 is moved by the beam drive unit 20.

In the first embodiment, the controller 1 sets the direction in which the laser beam 24 is moved by the beam drive unit 20 to be the same direction as the direction of travel of the machining head 10. Therefore, the beam drive unit 20 moves the laser beam 24 forward in the direction of travel of the machining head 10.

Also in the controller 1, as described above, the relationship between the direction of travel of the machining head 10 and the amount of shift by which the laser beam 24 is moved is set in advance. On the basis of such a relationship, the controller 1 obtains, from the direction of travel of the machining head 10, the amount of shift of the laser beam 24 by the beam drive unit 20. The controller 1 thus adjusts the amount of shift of the laser beam 24 from the tip portion of the wire 5 in accordance with the direction of travel of the machining head 10.

Figure 5:
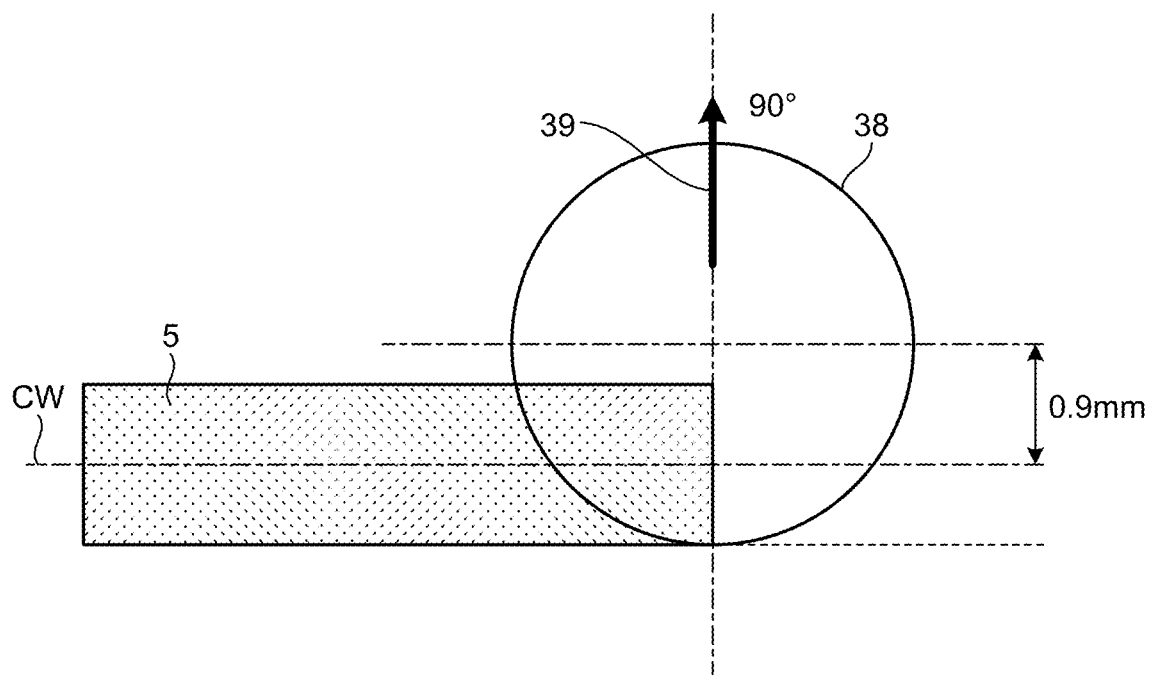
FIG. 5 is a diagram illustrating how the laser beam is moved by the additive manufacturing apparatus according to the first embodiment.

FIG. 5 is a diagram illustrating how the laser beam 24 is moved by the additive manufacturing apparatus 100 according to the first embodiment. FIG. 5 illustrates an example in which the direction of travel of the machining head 10 is 90°.

As described above, when the direction of travel of the machining head 10 is 90°, the amount of shift of the spot 38 is maximized. As illustrated in FIG. 5, when an edge of the wire 5 opposite to the direction of travel of the machining head 10 is aligned with an edge of the spot 38 opposite to the direction of travel of the machining head 10, the amount of shift of the spot 38 is maximized.

Note that when the direction of travel of the machining head 10 is 270° as well, the edge of the wire 5 opposite to the direction of travel of the machining head 10 is aligned with the edge of the spot 38 opposite to the direction of travel of the machining head 10. In such a state, the amount of shift of the spot 38 is maximized.

In FIG. 5, the wire 5 has a diameter of 1.2 mm, and the laser beam 24 has a diameter of 3.0 mm. The distance between the central axis CW of the wire 5 and the center of the spot 38 is 0.9 mm. That is, in the state illustrated in FIG. 5, the laser beam 24 is moved 0.9 mm forward from the tip portion of the wire 5.

When the direction of travel of the machining head 10 gradually changes from 0° to 90°, the amount of shift is increased by 0.01 mm each time the direction of travel of the machining head 10 changes by 1°. Thus, when the direction of travel of the machining head 10 gradually changes from 0° to 90°, the controller 1 gradually increases the amount of shift of the laser beam 24. When the direction of travel of the machining head 10 gradually changes from 90° to 180°, the amount of shift is decreased by 0.01 mm each time the direction of travel of the machining head 10 changes by 1°. Thus, when the direction of travel of the machining head 10 gradually changes from 90° to 180°, the controller 1 gradually decreases the amount of shift of the laser beam 24.

When the direction of travel of the machining head 10 gradually changes from 180° to 270°, as in the case of 0° to 90°, the controller 1 gradually increases the amount of shift of the laser beam 24. When the direction of travel of the machining head 10 gradually changes from 270° to 360°, as in the case of 90° to 180°, the controller 1 gradually decreases the amount of shift of the laser beam 24.

In the additive manufacturing apparatus 100, when the tip portion of the wire 5 comes into contact with an insufficiently melted portion of the workpiece, the wire 5 may be bent or may break. Alternatively, the insufficiently melted portion may become an obstacle and hinder the movement of the tip portion in the direction of the reference plane. The likelihood of occurrence of such a defect due to the presence of the insufficiently melted portion changes depending on the direction in which the tip portion of the wire 5 is moved. As the direction of travel of the tip portion of the wire 5 is closer to perpendicular to the central axis CW of the wire 5, such a defect is more likely to occur.

In the first embodiment, the additive manufacturing apparatus 100 moves the laser beam 24 by the beam drive unit 20 to adjust the irradiation position of the laser beam 24 with respect to the change in the direction in which the tip portion of the wire 5 is moved. The additive manufacturing apparatus 100 moves the laser beam 24 forward in the direction of travel of the machining head 10 to accelerate melting of the workpiece ahead of where the tip portion of the wire 5 is moved. The additive manufacturing apparatus 100 accelerates melting of the workpiece ahead of where the tip portion of the wire 5 is moved, thereby reducing the defect as described above. The additive manufacturing apparatus 100 can thus perform stable machining.

The additive manufacturing apparatus 100 increases the amount of shift of the laser beam 24 as the direction of travel of the tip portion of the wire 5 is closer to perpendicular to the central axis CW of the wire 5, thereby accelerating melting of the workpiece when the defect is more likely to occur. As a result, the additive manufacturing apparatus 100 can more effectively reduce the defect. The additive manufacturing apparatus 100 can also perform stable machining regardless of the direction of travel of the tip portion of the wire 5.

The additive manufacturing apparatus 100 accelerates melting of the workpiece ahead to thereby prevent the bead width from becoming narrower than expected due to the flow of the melted metal being hindered by the wire 5. The additive manufacturing apparatus 100 can thus form the bead 35 having a desired bead width.

According to the first embodiment, the additive manufacturing apparatus 100 determines, on the basis of the direction of travel of the tip portion of the wire 5, the direction in which the laser beam 24 is moved by the second drive unit. The additive manufacturing apparatus 100 controls the first drive unit and the second drive unit such that the laser beam 24 can be moved in the manner different from the movement of the tip portion of the wire 5 relative to the workpiece. The additive manufacturing apparatus 100 can reduce the defect caused by the wire 5 coming into contact with the insufficiently melted portion, and can achieve stable machining. The additive manufacturing apparatus 100 thus has an effect of achieving stable machining.

Second Embodiment

A second embodiment will describe an example in which the irradiation area of the laser beam 24 is expanded by moving the laser beam 24 at a high speed. The configuration of the additive manufacturing apparatus 100 according to the second embodiment is similar to the configuration of the additive manufacturing apparatus 100 according to the first embodiment. In the second embodiment, the same components as those in the above first embodiment are denoted by the same reference numerals as those assigned to such components in the first embodiment, and the operation different from that of the first embodiment will be mainly described.

Figure 6:
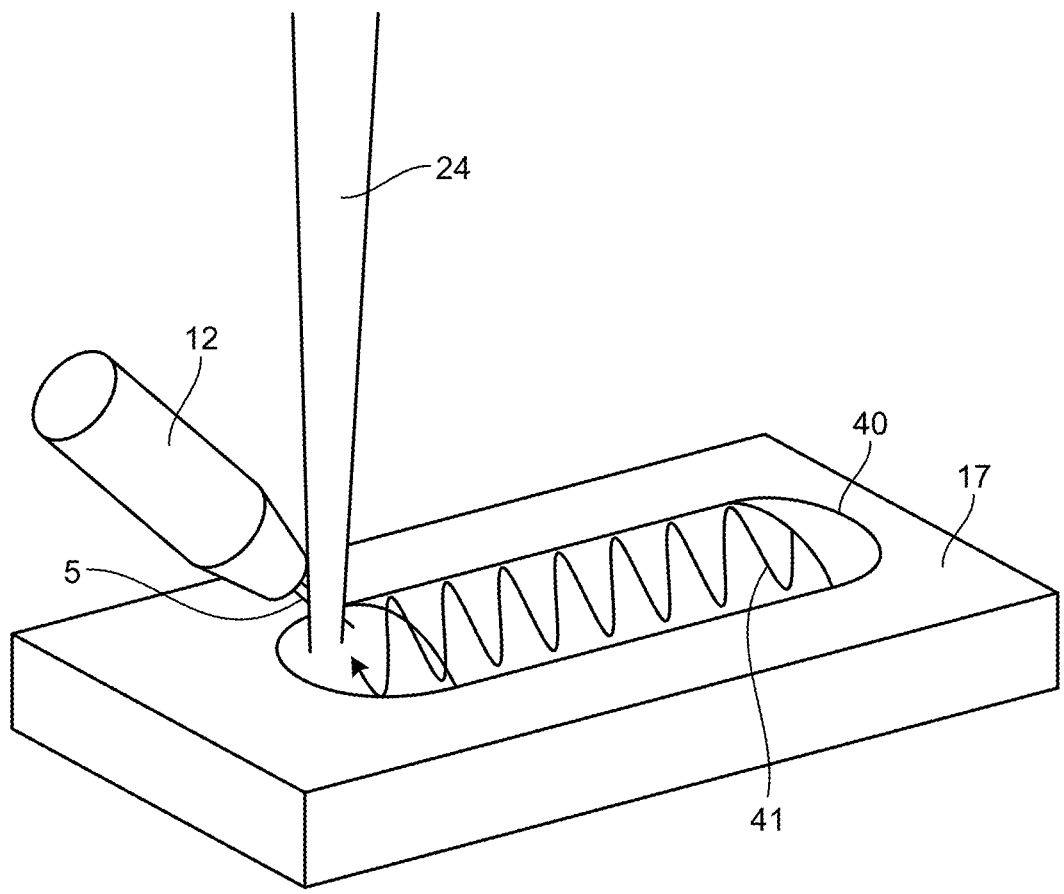
FIG. 6 is a diagram illustrating how the laser beam is moved by a beam drive unit of an additive manufacturing apparatus according to a second embodiment.

FIG. 6 is a diagram illustrating how the laser beam 24 is moved by the beam drive unit 20 of the additive manufacturing apparatus 100 according to the second embodiment. FIG. 6 illustrates an example in which the laser beam 24 is moved in an irradiation area 40 larger than the spot of the laser beam 24 on the substrate 17 that is the workpiece. FIG. 6 schematically illustrates how the laser beam 24 is moved in the irradiation area 40.

In the second embodiment, the beam drive unit 20 makes the irradiation area 40 of the laser beam 24 on the workpiece larger than the spot of the laser beam 24 by moving the laser beam 24 faster than the speed at which the tip portion of the wire 5 is moved. In FIG. 6, an arrow 41 indicates an example of a path in which the laser beam 24 is moved in the irradiation area 40.

Figure 7:
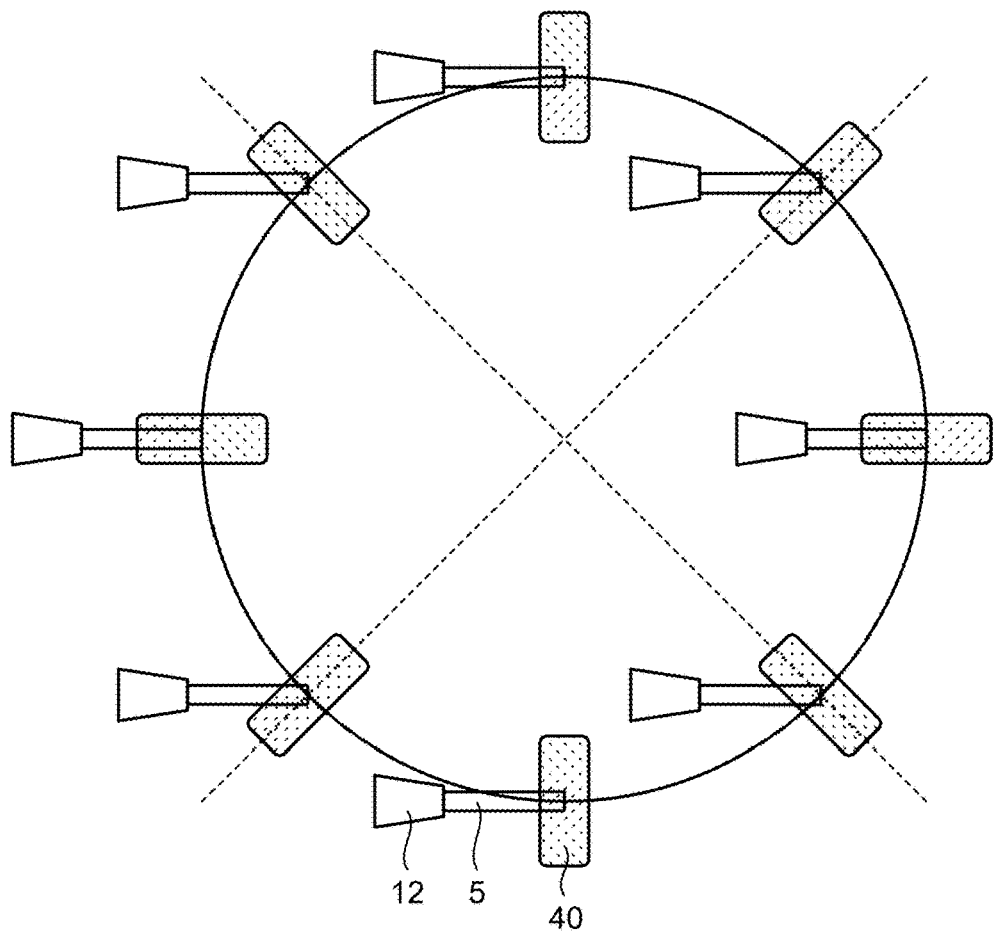
FIG. 7 is a first diagram for explaining an irradiation area in which the laser beam is moved by the beam drive unit of the additive manufacturing apparatus according to the second embodiment.
Figure 8:
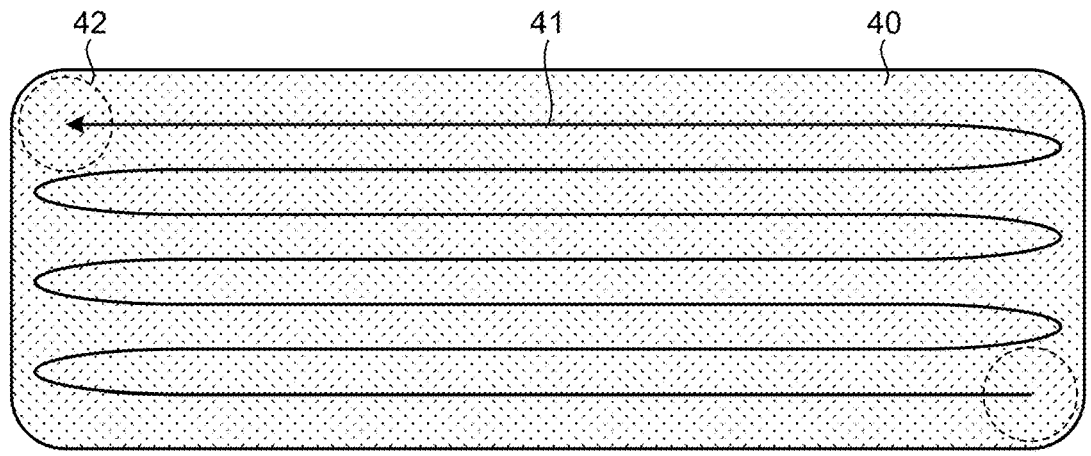
FIG. 8 is a second diagram for explaining the irradiation area in which the laser beam is moved by the beam drive unit of the additive manufacturing apparatus according to the second embodiment.

FIG. 7 is a first diagram for explaining the irradiation area 40 in which the laser beam 24 is moved by the beam drive unit 20 of the additive manufacturing apparatus 100 according to the second embodiment. FIG. 8 is a second diagram for explaining the irradiation area 40 in which the laser beam 24 is moved by the beam drive unit 20 of the additive manufacturing apparatus 100 according to the second embodiment. The irradiation area 40 illustrated in FIGS. 7 and 8 has a shape close to a rectangle in which each of four corners is deformed to be rounded.

FIG. 7 illustrates an example in which the orientation of the irradiation area 40 is changed in accordance with the change in the direction of travel of the machining head 10. In the example illustrated in FIG. 7, the orientation of the irradiation area 40 is changed such that the long side of the rectangle is perpendicular to the direction of travel of the tip portion of the wire 5. In the second embodiment, the controller 1 changes the orientation of the irradiation area 40 in accordance with the direction of travel of the tip portion of the wire 5 by determining the direction in which the laser beam 24 is moved on the basis of the direction of travel of the tip portion of the wire 5.

The controller 1 controls the head drive unit 14, i.e., the first drive unit and the beam drive unit 20, i.e., the second drive unit such that the laser beam 24 can be moved in a manner different from the movement of the tip portion of the wire 5 relative to the workpiece. The controller 1 thus moves the laser beam 24 faster than the speed at which the tip portion of the wire 5 is moved. In addition, the controller 1 controls to move the laser beam 24 in the direction determined in accordance with the direction of travel of the tip portion of the wire 5.

In FIG. 8, the arrow 41 indicates an example of the path in which the laser beam 24 is moved in the irradiation area 40. A spot 42 of the laser beam 24 has a circular shape smaller than the irradiation area 40. In the case of the example illustrated in FIG. 8, the beam drive unit 20 moves the spot 42 back and forth multiple times along the long side of the rectangle, thereby moving the spot 42 across the irradiation area 40. The additive manufacturing apparatus 100 moves the machining head 10 to move the irradiation area 40 on the workpiece.

The additive manufacturing apparatus 100 moves the spot 42 faster than the movement of the machining head 10, thereby achieving pseudo expansion of the spot 42 and performing irradiation with the laser beam 24. The bead 35 is formed in the irradiation area 40. The additive manufacturing apparatus 100 can form the bead 35 in the irradiation area 40 larger than the spot 42. The additive manufacturing apparatus 100 moves the laser beam 24 by the beam drive unit 20 to thereby perform machining similar to that when the spot 42 is expanded to the irradiation area 40. Note that the laser beam 24 in the irradiation area 40 can take any path not limited to the path indicated by the arrow 41 in FIG. 8.

For example, moving the laser beam 24 at a frequency of 1 kHz or higher can obtain the irradiation area 40 formed by pseudo expansion of the spot 42. In a case where the irradiation area 40 in the longitudinal direction thereof has a length of 6 mm, when the laser beam 24 is moved back and forth at an amplitude of 3 mm and a frequency of 1 kHz, the speed of movement of the laser beam 24 is approximately 20 m/sec. However, even in a case where the speed of movement of the laser beam 24 is lower than 20 m/sec, the irradiation area 40 formed by pseudo expansion of the spot 42 can be obtained. In this example, even when the speed of movement of the laser beam 24 is lower than 20 m/sec, the irradiation area 40 can be obtained as long as the speed of movement of the laser beam 24 is sufficiently higher than the speed of movement of the machining head 10. The speed of movement of the laser beam 24 being sufficiently higher than the speed of movement of the machining head 10 means that energy capable of forming the molten pool 33 can be applied to the irradiation area 40 by moving the laser beam 24. The additive manufacturing apparatus 100 sets the speed of movement of the laser beam 24 to a speed that is approximately 10 times to 20 times or more the speed of movement of the machining head 10, thereby obtaining the irradiation area 40 formed by pseudo expansion of the spot 42.

The additive manufacturing apparatus 100 forms the irradiation area 40 obtained by pseudo expansion of the spot 42, thereby forming the bead 35 having a width that is about five times to 10 times the diameter of the wire 5. The additive manufacturing apparatus 100 forms the irradiation area 40 by the movement of the laser beam 24, thereby increasing the energy density of the laser beam 24 as compared with a case where the diameter of the laser beam 24 is increased. Therefore, when forming the bead 35 having the width larger than the diameter of the wire 5, the additive manufacturing apparatus 100 can improve the machining speed as compared with the case where the diameter of the laser beam 24 is increased.

For example, when the irradiation area 40 being a rectangle of 2 mm by 8 mm is compared with a circular beam having a diameter of 8 mm, the energy density is 3.14 times higher in the case of the rectangle. The circular beam is the laser beam 24 having a circular cross section perpendicular to the central axis of the laser beam 24. The irradiation area 40 being the rectangle has anisotropy, so that if the orientation of the irradiation area 40 in the reference plane is fixed regardless of the direction of travel of the machining head 10, a change in the direction of travel of the machining head 10 causes a change in the width of the bead 35 as well. In the second embodiment, as described above, the orientation of the irradiation area 40 can be changed in accordance with the direction of travel, whereby the additive manufacturing apparatus 100 can form the bead 35 having a constant width while changing the direction of travel of the machining head 10.

The irradiation area 40 formed by pseudo expansion of the spot 42 is not limited to the rectangle described above, and may have a shape other than the rectangle. The additive manufacturing apparatus 100 can form the irradiation area 40 in any shape by the movement of the laser beam 24.

Figure 9:
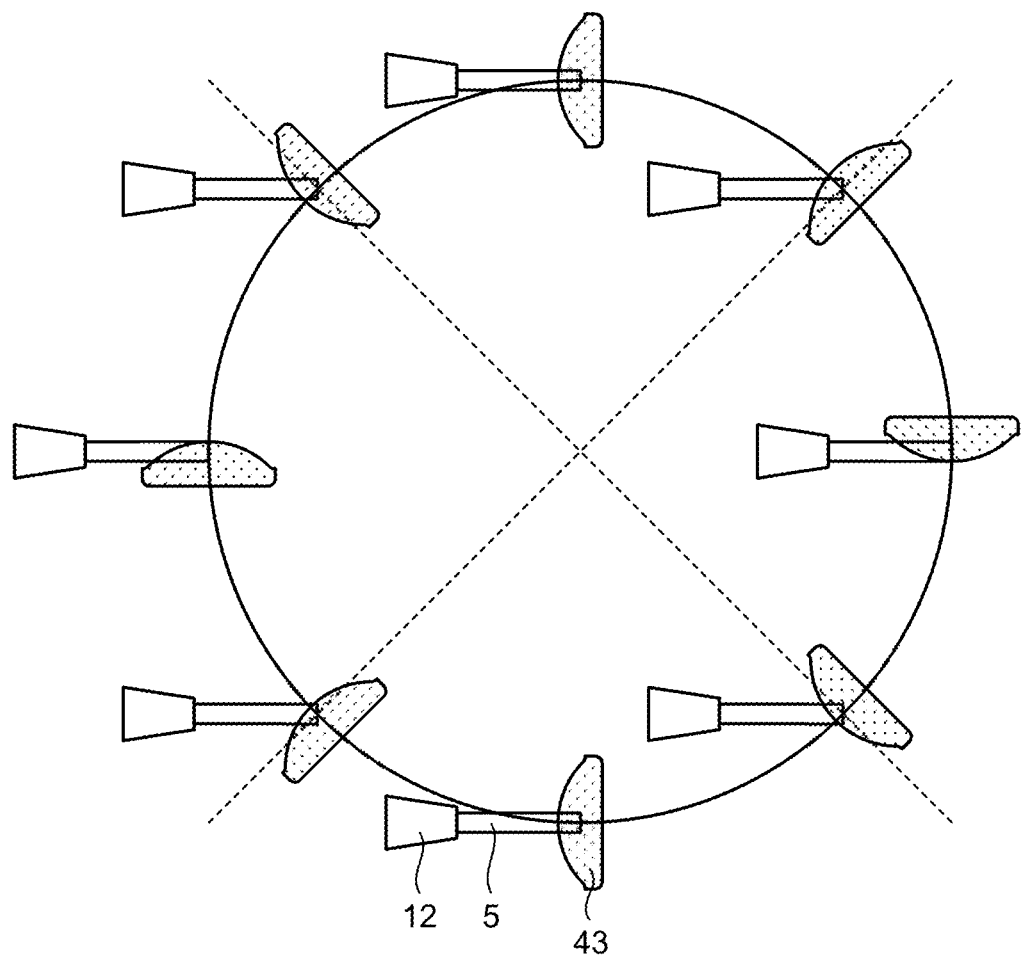
FIG. 9 is a diagram illustrating a first modification of the irradiation area in which the laser beam is moved by the beam drive unit of the additive manufacturing apparatus according to the second embodiment.

FIG. 9 is a diagram illustrating a first modification of the irradiation area 40 in which the laser beam 24 is moved by the beam drive unit 20 of the additive manufacturing apparatus 100 according to the second embodiment. An irradiation area 43 as the first modification of the irradiation area 40 has a shape in which one long side of the rectangle is changed to a curve, resulting in a shape similar to a cross section of a convex lens. FIG. 9 illustrates an example in which the orientation of the irradiation area 43 is changed in accordance with a change in the direction of travel of the machining head 10. In the example illustrated in FIG. 9, the orientation of the irradiation area 43 is changed such that the longitudinal direction of the shape of the irradiation area 43 is perpendicular to the direction of travel of the tip portion of the wire 5.

In the example illustrated in FIG. 9, when the direction of travel is 0° and 180°, the center of the irradiation area 43 coincides with the position of the tip portion of the wire 5. When the direction of travel is other than 0° or 180°, the center of the irradiation area 43 shifts forward in the direction of travel. When the direction of travel is 90° and 270°, the amount of shift by which the center of the irradiation area 43 is moved from the tip portion of the wire 5 is maximized. When the edge of the wire 5 opposite to the direction of travel of the machining head 10 is aligned with an edge of the irradiation area 43 opposite to the direction of travel of the machining head 10, the amount of shift of the irradiation area 43 is maximized. The beam drive unit 20 thus moves the irradiation area 43 forward in the direction of travel of the tip portion of the wire 5. That is, the beam drive unit 20 moves the laser beam 24 forward in the direction of travel. Moreover, the controller 1 adjusts the amount of shift of the center of the irradiation area 43 from the tip portion of the wire 5 in accordance with the direction of travel of the tip portion of the wire 5.

Moreover, in the example illustrated in FIG. 9, when the direction of travel is 0°, a portion of the outer shape of the irradiation area 43 corresponding to a flat surface opposite to a convex surface of the convex lens is oriented forward in the direction of travel. On the other hand, when the direction of travel is 180°, the said portion of the irradiation area 43 is oriented rearward in the direction of travel. Also, when the direction of travel is 135° and 225°, as with the case where the direction of travel is 180°, the said portion of the irradiation area 43 is oriented rearward in the direction of travel. The additive manufacturing apparatus 100 adjusts the orientation of the irradiation area 43 as described when the direction of travel is between 135° and 180°. By such adjustment, the additive manufacturing apparatus 100 sufficiently melts the workpiece in a portion of the irradiation area 43 where the laser beam 24 is less blocked by the wire 5. The additive manufacturing apparatus 100 sufficiently melts the workpiece by such adjustment of the irradiation area 43, thereby forming the bead 35 having a desired bead width.

The additive manufacturing apparatus 100 accelerates melting of the workpiece ahead of where the tip portion of the wire 5 is moved, thereby reducing a defect such as bending of the wire 5, breakage of the wire 5, or a problem with the movement of the wire 5. The additive manufacturing apparatus 100 can thus perform stable machining. The shape of the irradiation area 43 is obtained by deforming the rectangle, so that a change in the area of a portion of the wire 5 irradiated with the laser beam 24 is reduced. The change in the area according to the change in the direction of travel of the machining head 10 is reduced, whereby melting of the wire 5 is stabilized. The additive manufacturing apparatus 100 stabilizes melting of the wire 5 to thereby accurately form the bead 35 having a desired width.

Figure 10:
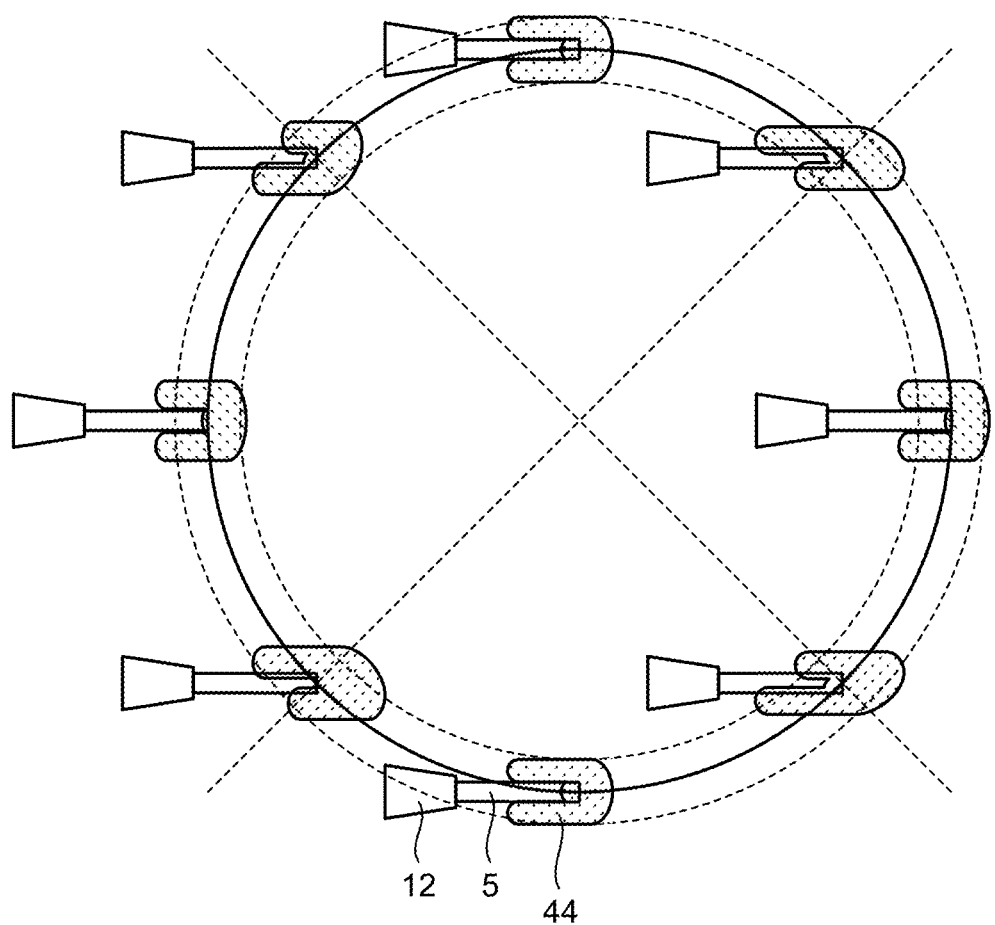
FIG. 10 is a diagram illustrating a second modification of the irradiation area in which the laser beam is moved by the beam drive unit of the additive manufacturing apparatus according to the second embodiment.

FIG. 10 is a diagram illustrating a second modification of the irradiation area 40 in which the laser beam 24 is moved by the beam drive unit 20 of the additive manufacturing apparatus 100 according to the second embodiment. An irradiation area 44 as the second modification of the irradiation area 40 has a so-called horseshoe shape. FIG. 10 illustrates an example in which the shape of the irradiation area 44 is changed in accordance with the change in the direction of travel of the machining head 10. In the example illustrated in FIG. 10, the shape of the irradiation area 44 changes such that the area of the portion of the wire 5 irradiated with the laser beam 24 is constant.

When the area of the portion of the wire 5 irradiated with the laser beam 24 is constant regardless of the direction of travel of the machining head 10, melting of the wire 5 is stabilized. The additive manufacturing apparatus 100 changes the shape of the irradiation area 44 as appropriate, thereby sufficiently melting both an edge of the wire 5 on the front side in the direction of travel of the machining head 10 and an edge of the wire 5 on the rear side in the direction of travel of the machining head 10. The additive manufacturing apparatus 100 stabilizes melting of the wire 5 to thereby accurately form the bead 35 having a desired width. The additive manufacturing apparatus 100 changes the shape of the irradiation area 44 as appropriate, thereby setting the area of the portion of the wire 5 irradiated with the laser beam 24 to any area. The additive manufacturing apparatus 100 can set at will the area of the portion of the wire 5 irradiated with the laser beam 24 in accordance with an amount of material desired to be melted.

As exemplified in the second embodiment, the additive manufacturing apparatus 100 sets the path in which the laser beam 24 is moved by the beam drive unit 20 as appropriate, thereby forming the irradiation area 40 in any desired shape. The irradiation area 40 may have, for example, a circular shape with a diameter larger than the diameter of the laser beam 24. The additive manufacturing apparatus 100 sets the shape of the irradiation area 40 as appropriate to thereby easily form the bead 35 having any desired width. The additive manufacturing apparatus 100 can form the bead 35 having any desired width without increasing the diameter of the laser beam 24. That is, the additive manufacturing apparatus 100 can form the bead 35 having any desired width by using the laser beam 24 having a small diameter.

Here, advantages of using the laser beam 24 having a small diameter will be described. A first advantage is that, as described above, the shape of the irradiation area 40 can be set as appropriate, so that the bead 35 having a desired width can be accurately formed. A second advantage is that the energy density of the laser beam 24 can be increased, so that an object can be formed using a highly reflective material such as copper, gold, or silver as the material.

The following Formula (1) is a temperature rise formula at the time of single-pulse machining using a circular heat source. In Formula (1), "θ" represents temperature, "A" represents thermal absorptivity, "P" represents average power, "a" represents a radius of the spot, and "K" represents thermal conductivity. Moreover, "$J_0$" represents a Bessel function of the first kind of order zero, "$J_1$" represents a Bessel function of the first kind of order one, "r" represents a measurement distance, and "t" represents irradiation time. According to such a temperature rise formula, one can see that, when the surface of gold is melted, for example, beam intensity of about 3 MW/cm$^2$ is required. When laser power is 6 kW, the beam diameter needs to be 0.5 mm or smaller.

Formula 1:

$$\theta = \frac{AP}{2\pi aK} \int_0^\infty J_0(\lambda r) J_1(\lambda a) \times \left\{ e^{-\lambda z}\text{erfc}\left[\frac{z}{2\sqrt{\alpha t}} - \lambda\sqrt{\alpha t}\right] - e^{-\lambda z}\text{erfc}\left[\frac{z}{2\sqrt{\alpha t}} + \lambda\sqrt{\alpha t}\right] \right\} \frac{d\lambda}{\lambda} \quad (1)$$

In a case where a typical metal wire having a diameter of 1 mm or larger is used, the beam diameter of 0.5 mm is too small. Therefore, machining using such a typical metal wire cannot use a beam having the beam diameter of 0.5 mm. On the other hand, according to the second embodiment, the bead 35 having any desired width can be formed, and thus the laser beam 24 having the beam diameter of about 0.5 mm or 0.5 mm or smaller can be used. Therefore, the additive manufacturing apparatus 100 can form the object using the wire 5 made of the highly reflective material. The additive manufacturing apparatus 100 can perform building with the highly reflective materials using a laser used in conventional additive manufacturing without using a special laser with high power.

According to the second embodiment, the additive manufacturing apparatus 100 makes the irradiation area 40 of the laser beam 24 on the workpiece larger than the spot 42 by moving the laser beam 24 faster than the speed at which the tip portion of the wire 5 is moved. Therefore, the additive manufacturing apparatus 100 can accurately form the bead 35 having a desired width. Moreover, the additive manufacturing apparatus 100 can use the laser beam 24 having the diameter smaller than the diameter of the wire 5, thereby forming the object using the wire 5 made of the highly reflective material.

Third Embodiment

A third embodiment will describe an example in which an object is formed by switching between fine building and rough building. The configuration of the additive manufacturing apparatus 100 according to the third embodiment is similar to the configuration of the additive manufacturing apparatus 100 according to the first embodiment. In the third embodiment, the same components as those in the above first or second embodiment are denoted by the same reference numerals as those assigned to such components in the first or second embodiment, and the operation different from that of the first or second embodiment will be mainly described.

Figure 11:
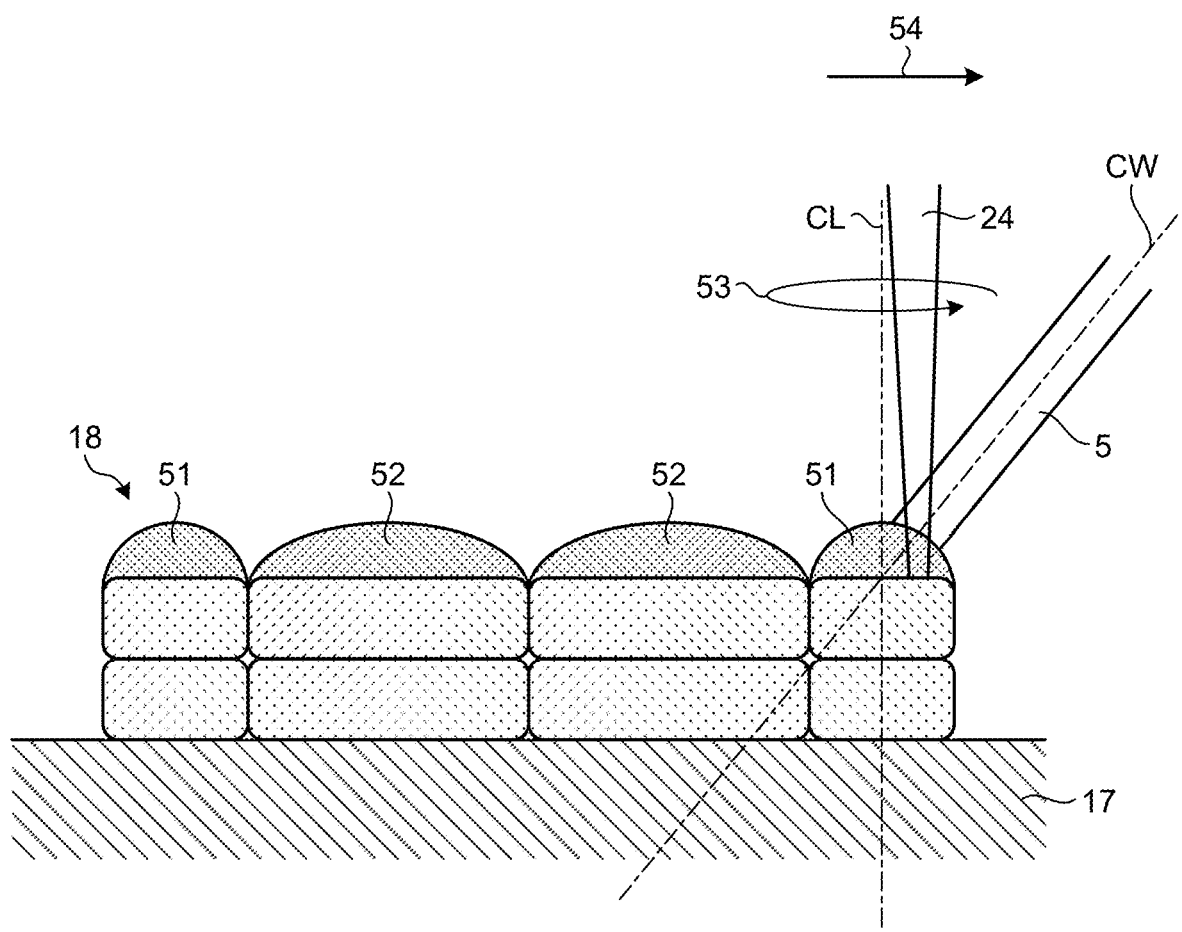
FIG. 11 is a diagram illustrating how an object is formed by an additive manufacturing apparatus according to a third embodiment.

FIG. 11 is a diagram illustrating how an object is formed by the additive manufacturing apparatus 100 according to the third embodiment. The additive manufacturing apparatus 100 adjusts an amount of movement of the laser beam 24 by the beam drive unit 20 for each portion of the workpiece, thereby switching between fine building and rough building for each portion of the workpiece. Fine building is building that focuses on increasing the shape accuracy of the object rather than increasing the machining speed. Rough building is building that focuses on increasing the machining speed rather than increasing the shape accuracy of the object.

An arrow 53 indicates that the laser beam 24 is moved by the beam drive unit 20. An arrow 54 indicates the direction of travel of the machining head 10. A bead 51 is the bead 35 formed by fine building. A bead 52 is the bead 35 formed by rough building. Compared to the bead 52, the bead 51 has a smaller bead width in the direction of travel of the machining head 10. In the third embodiment, the beam drive unit 20 varies the size of the irradiation area 40 at different positions on the reference plane of the workpiece.

In the example illustrated in FIG. 11, the beam drive unit 20 reduces the width of the irradiation area 40 at each of both ends of the workpiece along the direction of travel of the machining head 10 compared to other portions of the workpiece. The beam drive unit 20 adjusts the amount of movement of the laser beam 24 in the direction of travel of the machining head 10, thereby adjusting the width of the irradiation area 40. In the example illustrated in FIG. 11, the beam drive unit 20 adjusts the width of the irradiation area 40 by adjusting the width in which the laser beam 24 is moved back and forth in the direction of travel of the machining head 10. The additive manufacturing apparatus 100 adjusts the width of the irradiation area 40 to adjust the bead width of the bead 35 that is formed. The additive manufacturing apparatus 100 adjusts the bead width according to the position on the workpiece, thereby forming the bead 51 at each of the both ends of the workpiece and forming the bead 52 in the portion other than the both ends of the workpiece.

As described above, the additive manufacturing apparatus 100 adjusts the width of the irradiation area 40 according to the position on the reference plane of the workpiece, thereby varying the size of the irradiation area 40 according to the position on the workpiece. The additive manufacturing apparatus 100 varies the size of the irradiation area 40 according to the position on the workpiece, thereby switching between the formation of the bead 51 and the formation of the bead 52 according to the position on the workpiece.

The additive manufacturing apparatus 100 performs fine building on the both ends of the object to thereby form the object having a highly accurate outer shape. Furthermore, the additive manufacturing apparatus 100 performs rough building on the portion other than the both ends of the object to thereby shorten the machining time of the entire object.

Figure 12:
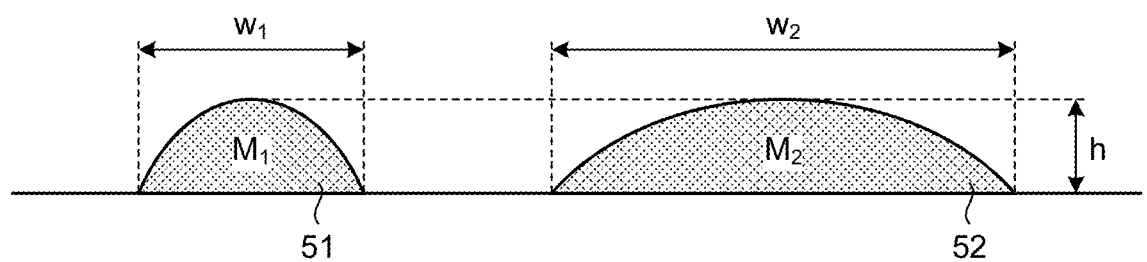
FIG. 12 is a diagram for explaining shapes of beads formed by the additive manufacturing apparatus according to the third embodiment.

FIG. 12 is a diagram for explaining the shapes of the beads 51 and 52 formed by the additive manufacturing apparatus 100 according to the third embodiment. FIG. 12 illustrates a cross section of the bead 51 and a cross section of the bead 52. These cross sections are cross sections including the direction of travel of the machining head 10 and the central axis CL of the beam nozzle 11.

When a bead width of the bead 51 is represented by "$w_1$", a cross-sectional area of the bead 51 is represented by "$M_1$", a bead width of the bead 52 is represented by "$w_2$", a cross-sectional area of the bead 52 is represented by "$M_2$", and heights of the beads 51 and 52 in the direction of the central axis CL are represented by "h", the following Formulas (2) and (3) are established.

$$M_1 = w_1/2 \times h/2 \times \pi \quad (2)$$

$$M_2 = w_2/2 \times h/2 \times \pi \quad (3)$$

For example, when h=0.5 mm, $w_1$=1 mm, and $w_2$=6 mm, Formulas (2) and (3) give $M_1$=0.4 mm$^2$ and $M_2$=2.4 mm$^2$. The cross-sectional area of the bead 52 is approximately six times the cross-sectional area of the bead 51.

A building speed WFR as the speed at which the bead 51 or the bead 52 is formed by the additive manufacturing apparatus 100 is obtained by the following Formula (4). In Formula (4), "F" represents the speed at which the laser beam 24 is moved by the beam drive unit 20. Moreover, "$M_i$" (i=1, 2) represents the cross-sectional area $M_1$ of the bead 51 or the cross-sectional area $M_2$ of the bead 52.

$$WFR(cc/h) = F(\text{mm/min}) \times M_i(\text{mm}^2) \times 60(\text{min}) \times 1000 \quad (4)$$

Assuming that the speed of movement of the laser beam 24 in fine building is the same as the speed of movement of the laser beam 24 in rough building, the building speed WFR in rough building can be approximately six times the building speed WFR in fine building. The additive manufacturing apparatus 100 applies fine building to the machining of a portion requiring high shape accuracy and applies rough building to the machining of other portions, thereby performing high-speed building of the object while maintaining the shape accuracy.

In order to achieve a high machining speed for the portion subject to rough building, it is necessary to increase the amount of movement of the laser beam 24 and also increase the feed of the wire 5 and the amount of heat input for melting the wire 5. The additive manufacturing apparatus 100 increases the amount of heat input for melting the wire 5 by increasing at least one of the laser power of the laser oscillator 2 and the amount of current flowing from the hot wire power supply 21 to the wire 5. As a result, the additive manufacturing apparatus 100 can sufficiently melt the wire 5, and can achieve the high machining speed for the portion subject to rough building.

Note that also in the third embodiment, the controller 1 may determine the direction in which the laser beam 24 is moved by the beam drive unit 20 on the basis of the direction of travel of the tip portion of the wire 5.

According to the third embodiment, the additive manufacturing apparatus 100 varies the size of the irradiation area 40 at different positions on the reference plane of the workpiece. The additive manufacturing apparatus 100 can switch between fine building and rough building according to the position on the reference plane of the workpiece. For each portion of the object, the additive manufacturing apparatus 100 can set at will to perform either the machining focusing on the shape accuracy or the machining focusing on the machining speed. As a result, the additive manufacturing apparatus 100 can perform high-speed building of the object while maintaining the shape accuracy.

Fourth Embodiment

A fourth embodiment will describe an example of changing the width in which the laser beam 24 is moved back and forth in the irradiation area 40. The configuration of the additive manufacturing apparatus 100 according to the fourth embodiment is similar to the configuration of the additive manufacturing apparatus 100 according to the first embodiment. In the fourth embodiment, the same components as those in the above first to third embodiments are denoted by the same reference numerals as those assigned to such components in the first to third embodiments, and the operation different from that of the first to third embodiments will be mainly described.

Figure 13:
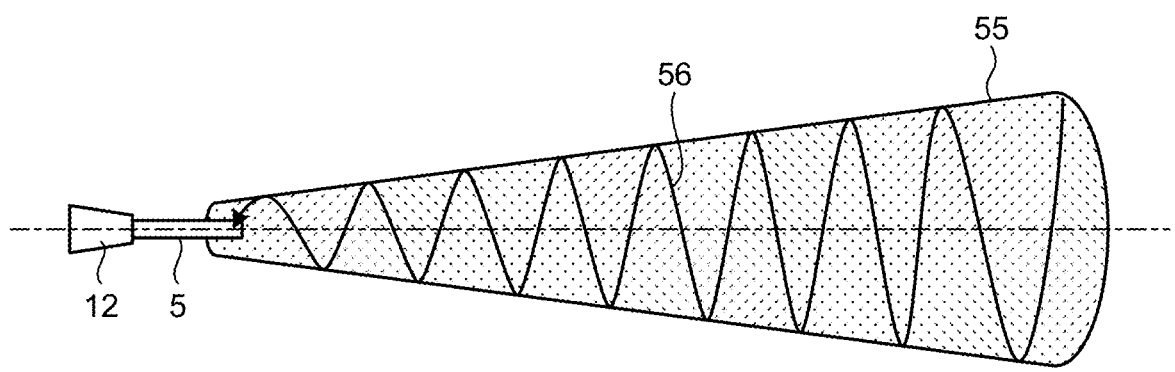
FIG. 13 is a diagram illustrating how the laser beam is moved by an additive manufacturing apparatus according to a fourth embodiment.

FIG. 13 is a diagram illustrating how the laser beam 24 is moved by the additive manufacturing apparatus 100 according to the fourth embodiment. In the fourth embodiment, the beam drive unit 20 makes an irradiation area 55 of the laser beam 24 on the workpiece larger than the spot of the laser beam 24 by moving the laser beam 24 faster than the speed at which the tip portion of the wire 5 is moved. The irradiation area 55 is an example of the irradiation area 40 in the case of changing the width in which the laser beam 24 is moved back and forth. In FIG. 13, an arrow 56 indicates an example of a path in which the laser beam 24 is moved in the irradiation area 55.

In the fourth embodiment, the beam drive unit 20 moves the laser beam 24 back and forth in the irradiation area 55, and also gradually changes the width in which the laser beam 24 is moved back and forth in the irradiation area 55. In the example illustrated in FIG. 13, the beam drive unit 20 reduces the width in which the laser beam 24 is moved back and forth as the laser beam 24 approaches the tip portion of the wire 5. As a result, the irradiation area 55 has a shape in which the width in the direction of moving the laser beam 24 back and forth continuously changes. The additive manufacturing apparatus 100 thus forms the bead 35 having a shape with the width continuously changing.

Figure 14:
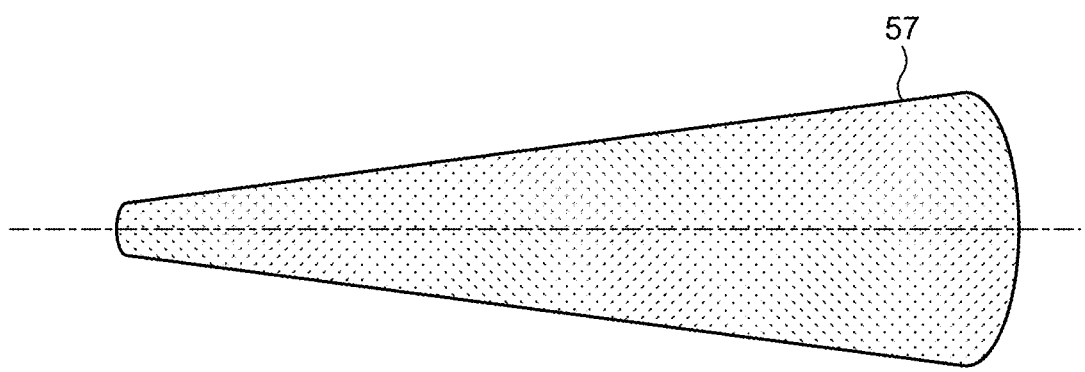
FIG. 14 is a diagram illustrating a bead formed in the fourth embodiment.
Figure 15:
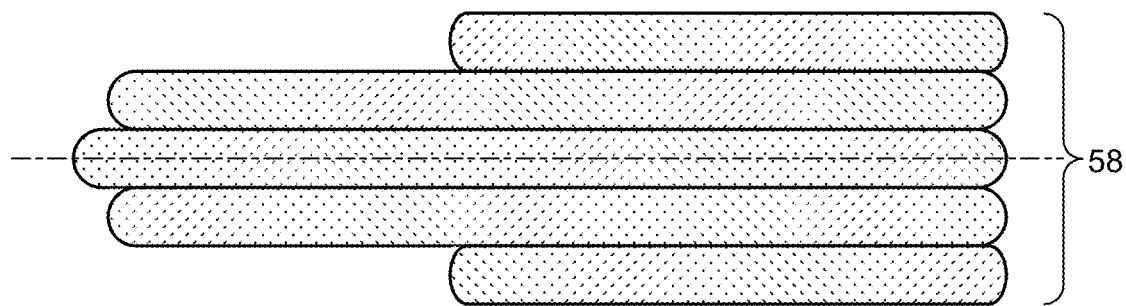
FIG. 15 is a diagram illustrating a bead formed in a comparative example of the fourth embodiment.

FIG. 14 is a diagram illustrating a bead 57 formed in the fourth embodiment. FIG. 15 is a diagram illustrating a bead 58 formed in a comparative example of the fourth embodiment. The bead 57 illustrated in FIG. 14 is an example of the bead 35 that is formed in the fourth embodiment and has the shape with the width continuously changing. The bead 58 illustrated in FIG. 15 is a combination of a plurality of line beads, and is formed by a method different from that of the fourth embodiment. The line bead is a linear bead.

In the case of forming the shape with the width continuously changing, the bead 57 illustrated in FIG. 14 achieves higher shape reproducibility than the bead 58 illustrated in FIG. 15. According to the fourth embodiment, the additive manufacturing apparatus 100 gradually changes the width in which the laser beam 24 is moved back and forth in the irradiation area 55, thereby performing building with high shape reproducibility.

Note that, in the fourth embodiment, the path in which the laser beam 24 is moved by the beam drive unit 20 is set as appropriate, whereby the irradiation area 55 can have any desired shape. Also in the fourth embodiment, the controller 1 may determine the direction in which the laser beam 24 is moved by the beam drive unit 20 on the basis of the direction of travel of the tip portion of the wire 5.

Fifth Embodiment

A fifth embodiment will describe an example in which an object is formed with a ball bead. The ball bead is a dotted bead. The configuration of the additive manufacturing apparatus 100 according to the fifth embodiment is similar to the configuration of the additive manufacturing apparatus 100 according to the first embodiment. In the fifth embodiment, the same components as those in the above first to fourth embodiments are denoted by the same reference numerals as those assigned to such components in the first to fourth embodiments, and the operation different from that of the first to fourth embodiments will be mainly described.

Figure 16:
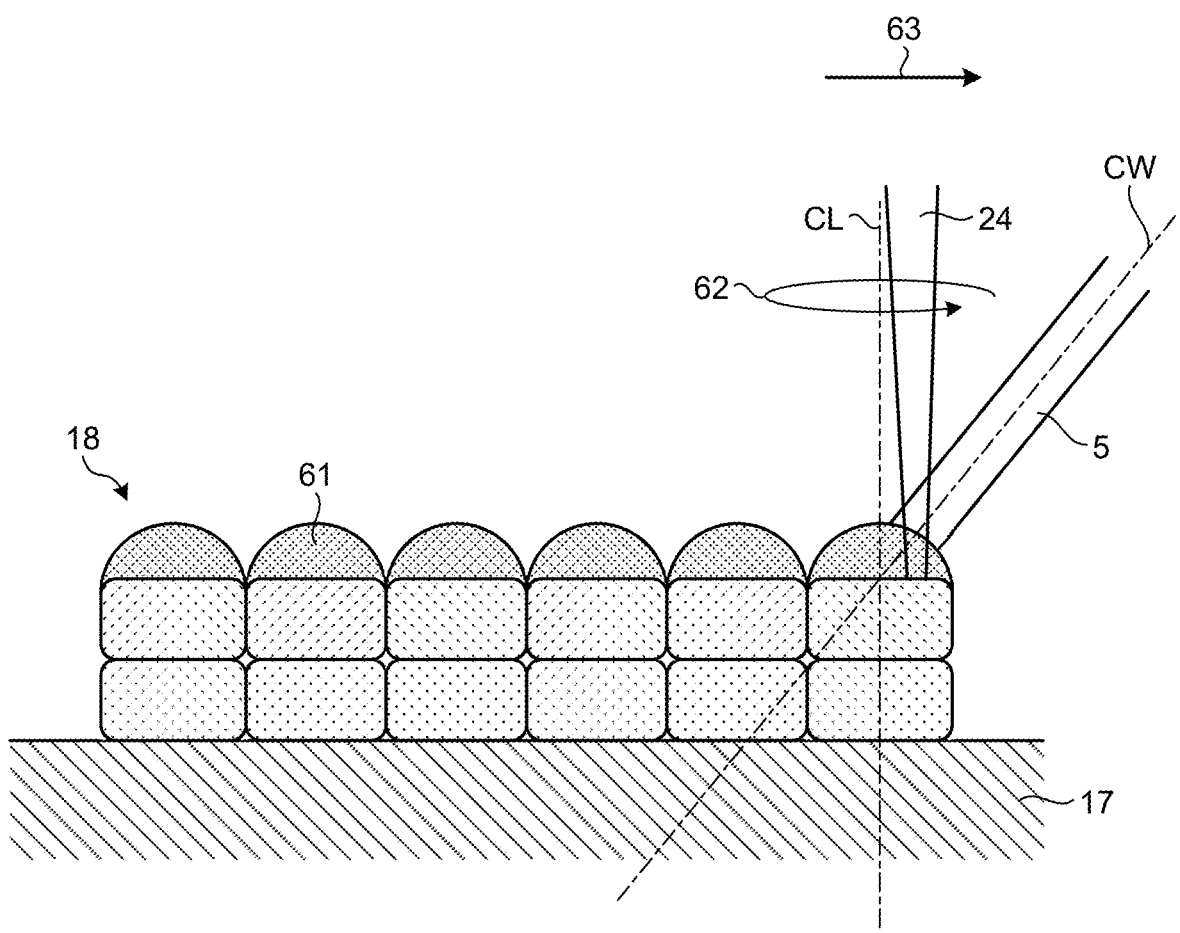
FIG. 16 is a diagram illustrating how an object is formed by an additive manufacturing apparatus according to a fifth embodiment.

FIG. 16 is a diagram illustrating how the object is formed by the additive manufacturing apparatus 100 according to the fifth embodiment. The additive manufacturing apparatus 100 forms the object with a bead 61 that is the ball bead. An arrow 62 indicates that the laser beam 24 is moved by the beam drive unit 20. An arrow 63 indicates the direction of travel of the machining head 10. The beam drive unit 20 as the second drive unit moves the laser beam 24 in a direction included in the reference plane. When the bead 61 is formed, the controller 1 controls the beam drive unit 20 to move the laser beam 24 in the direction included in the reference plane.

Figure 17:
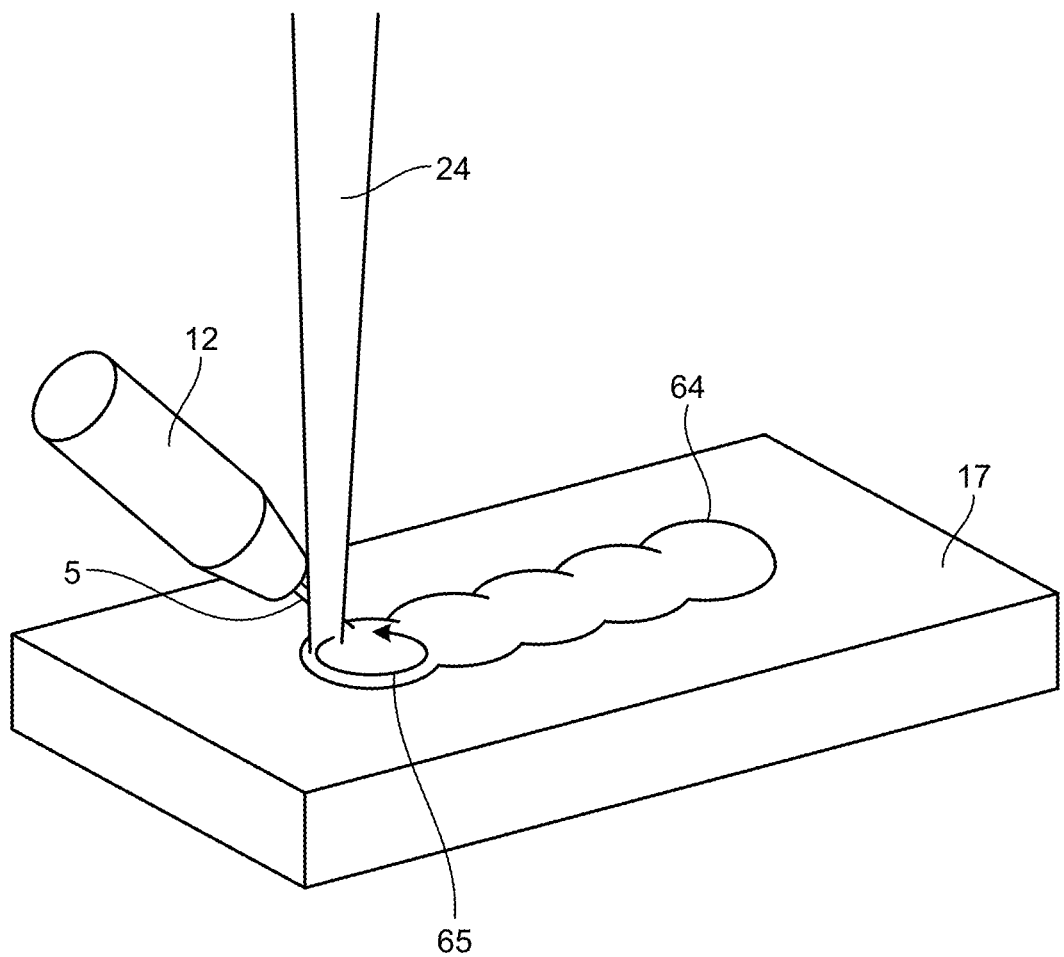
FIG. 17 is a first diagram illustrating how the laser beam is moved by a beam drive unit of the additive manufacturing apparatus according to the fifth embodiment.

FIG. 17 is a first diagram illustrating how the laser beam 24 is moved by the beam drive unit 20 of the additive manufacturing apparatus 100 according to the fifth embodiment. FIG. 17 illustrates an example in which the laser beam 24 is moved in an irradiation area 64 larger than the spot of the laser beam 24 on the substrate 17 that is the workpiece. FIG. 17 schematically illustrates how the laser beam 24 is moved in the irradiation area 64. An arrow 65 illustrated in FIG. 17 indicates a path in which the laser beam 24 is moved in the irradiation area 64. The beam drive unit 20 moves the laser beam 24 to make the irradiation area 64 of the laser beam 24 on the workpiece larger than the spot of the laser beam 24.

In FIG. 17, a plurality of the irradiation areas 64 is lined up in the direction of travel of the machining head 10. Each of the irradiation areas 64 is circular. The bead 61 is formed in each of the irradiation areas 64. As a result, the bead 61 having a circular shape on the reference plane is formed on the workpiece. Note that the additive manufacturing apparatus 100 according to the fifth embodiment is not limited to forming the entire object with the ball bead. The additive manufacturing apparatus 100 need only form the ball bead included in the object in at least a part of the object.

Figure 18:
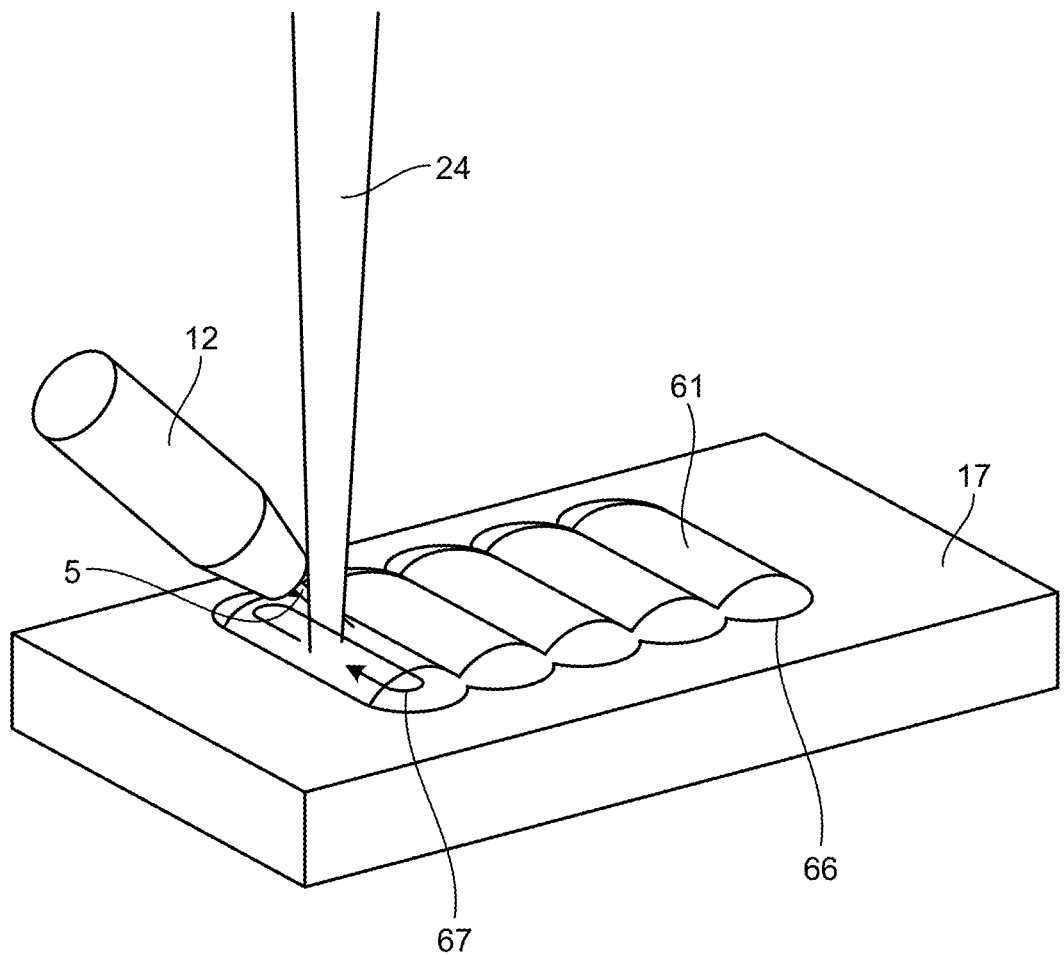
FIG. 18 is a second diagram illustrating how the laser beam is moved by the beam drive unit of the additive manufacturing apparatus according to the fifth embodiment.

FIG. 18 is a second diagram illustrating how the laser beam 24 is moved by the beam drive unit 20 of the additive manufacturing apparatus 100 according to the fifth embodiment. FIG. 18 illustrates an example in which the laser beam 24 is moved in an irradiation area 66 having a shape different from that of the irradiation area 64 illustrated in FIG. 17. FIG. 18 schematically illustrates how the laser beam 24 is moved in the irradiation area 66. An arrow 67 illustrated in FIG. 18 indicates a path in which the laser beam 24 is moved in the irradiation area 66.

In FIG. 18, a plurality of the irradiation areas 66 is lined up in the direction of travel of the machining head 10. Each of the irradiation areas 66 is elliptical. The bead 61 is formed in each of the irradiation areas 66. As a result, the bead 61 having an elliptical shape on the reference plane is formed on the workpiece. As described above, the additive manufacturing apparatus 100 sets the shapes of the irradiation areas 64 and 66 as appropriate to thereby form the bead 61 having any desired shape.

Next, the formation of the ball bead by the additive manufacturing apparatus 100 according to the fifth embodiment will be described. Here, a description of how the ball bead is formed by the additive manufacturing apparatus 100 will be made for each step. Through the steps, the additive manufacturing apparatus 100 forms the ball bead on the substrate 17 as the workpiece.

Figure 19:
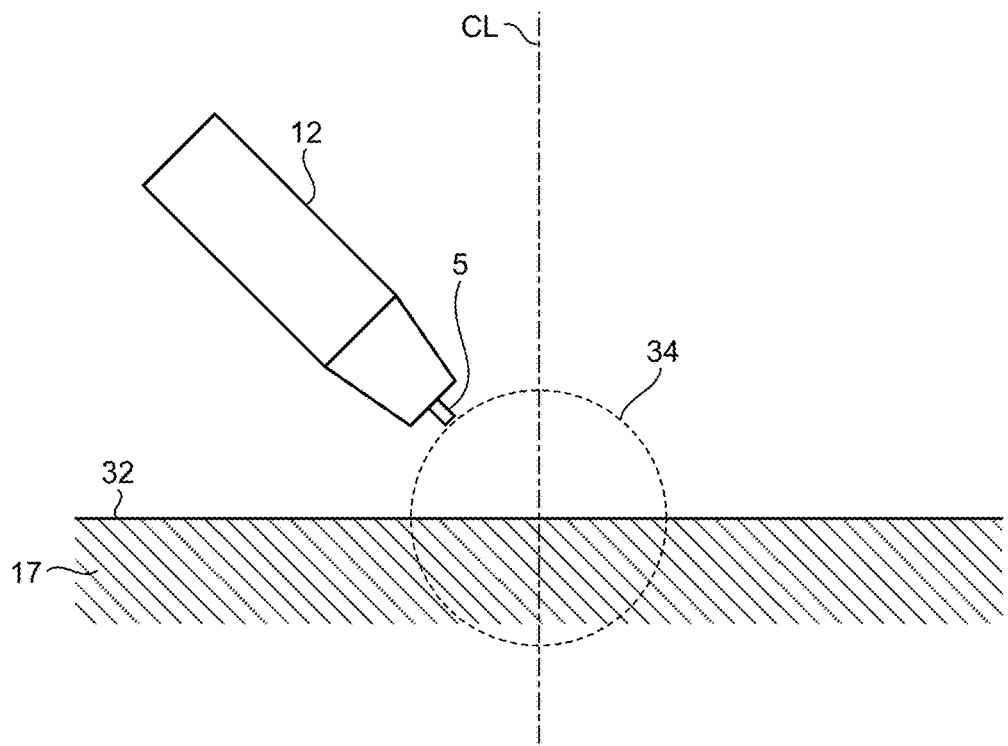
FIG. 19 is a diagram for explaining a first step of forming a ball bead by the additive manufacturing apparatus according to the fifth embodiment.

FIG. 19 is a diagram for explaining a first step of forming the ball bead by the additive manufacturing apparatus 100 according to the fifth embodiment. In the first step, the additive manufacturing apparatus 100 moves the machining head 10 to align the central axis CL of the laser beam 24 with the center of the machining area 34.

Figure 20:
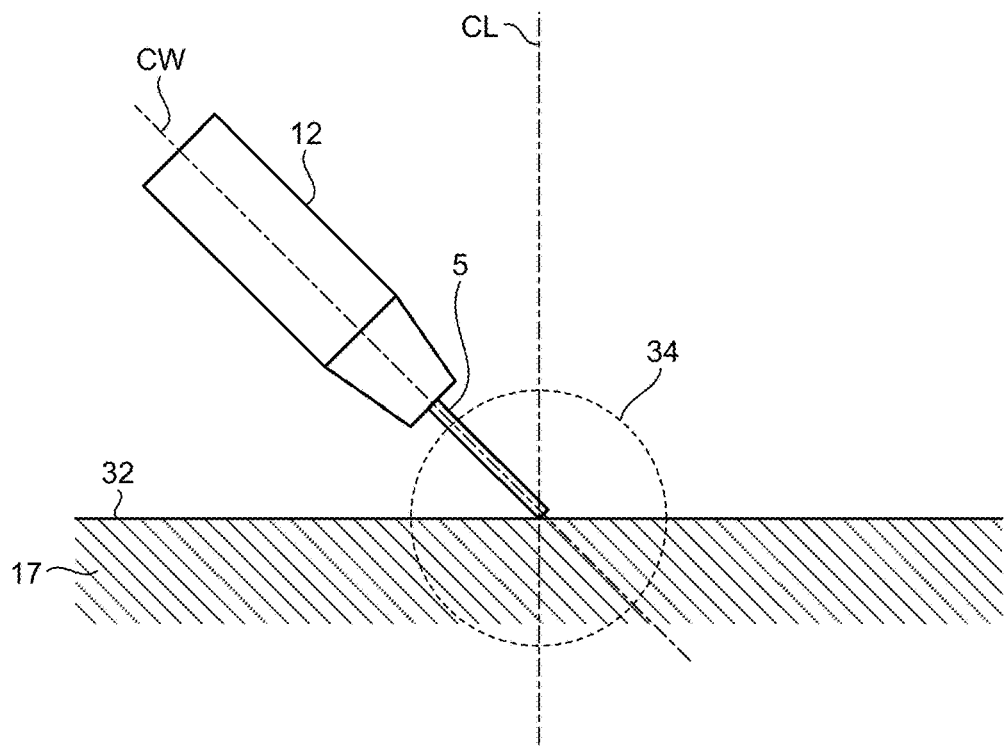
FIG. 20 is a diagram for explaining a second step of forming the ball bead by the additive manufacturing apparatus according to the fifth embodiment.

FIG. 20 is a diagram for explaining a second step of forming the ball bead by the additive manufacturing apparatus 100 according to the fifth embodiment. In the second step, the additive manufacturing apparatus 100 sends the wire 5 from the wire nozzle 12 to the machining area 34 and brings the tip portion of the wire 5 into contact with the surface 32 of the substrate 17. The central axis CL of the beam nozzle 11 and the central axis CW of the wire 5 intersect at the surface 32.

Figure 21:
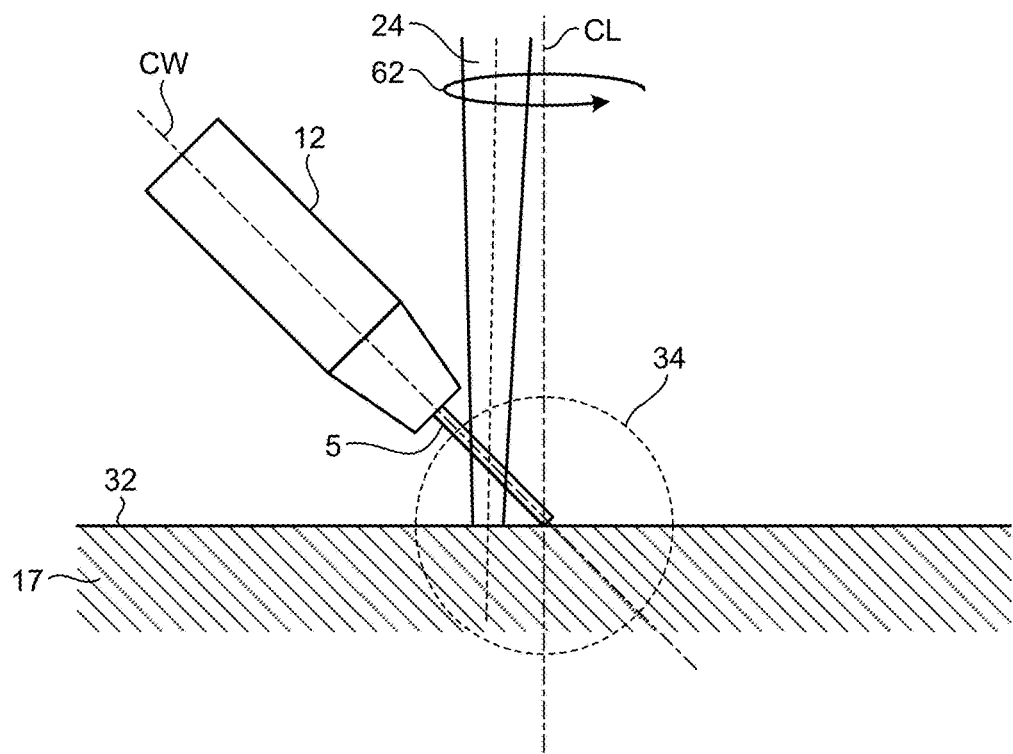
FIG. 21 is a diagram for explaining a third step of forming the ball bead by the additive manufacturing apparatus according to the fifth embodiment.

FIG. 21 is a diagram for explaining a third step of forming the ball bead by the additive manufacturing apparatus 100 according to the fifth embodiment. The additive manufacturing apparatus 100 emits the laser beam 24 toward the machining area 34. The beam drive unit 20 moves the laser beam 24 in the irradiation area 64 or 66.

With the emission of the laser beam 24, the additive manufacturing apparatus 100 starts ejection of the inert gas 25 from the gas nozzle 13 to the machining area 34. The additive manufacturing apparatus 100 may eject the inert gas 25 at a predetermined time before starting the emission of the laser beam 24. This allows the additive manufacturing apparatus 100 to remove active gas such as oxygen remaining in the gas nozzle 13 from the gas nozzle 13, and then start the ejection of the inert gas 25.

Figure 22:
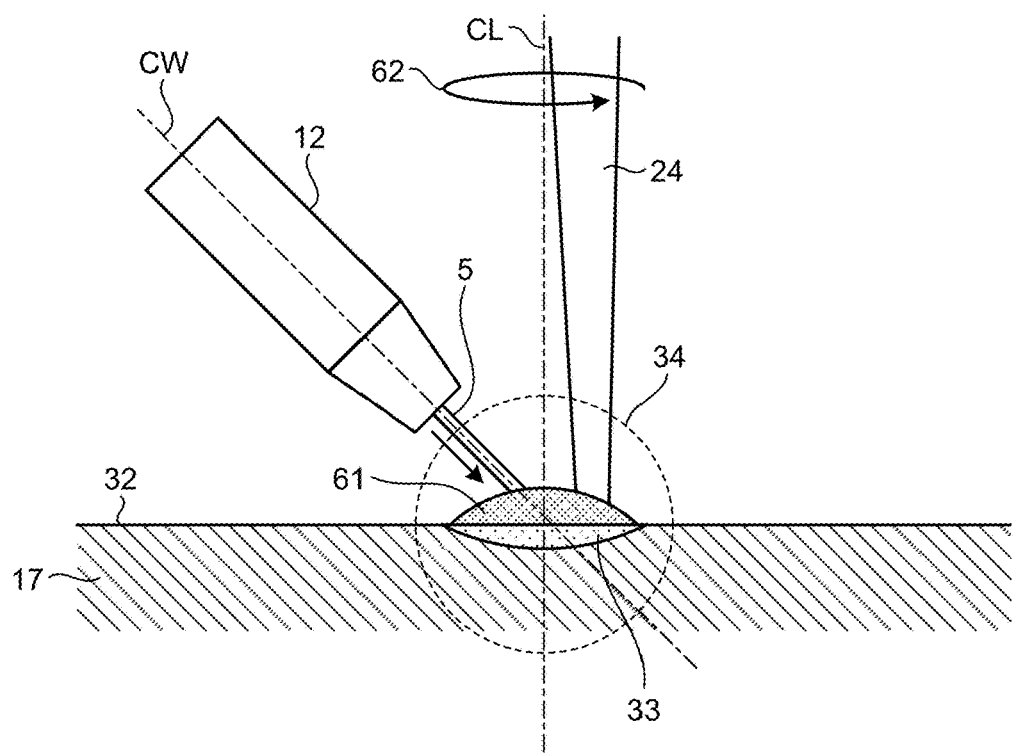
FIG. 22 is a diagram for explaining a fourth step of forming the ball bead by the additive manufacturing apparatus according to the fifth embodiment.

FIG. 22 is a diagram for explaining a fourth step of forming the ball bead by the additive manufacturing apparatus 100 according to the fifth embodiment. The additive manufacturing apparatus 100 feeds the wire 5 from the wire nozzle 12 toward the surface 32. Accordingly, the additive manufacturing apparatus 100 starts feeding the wire 5 to the machining area 34.

By the irradiation with the laser beam 24, the molten pool 33 is formed at the portion of the surface 32 in the machining area 34. The melt 31 of the wire 5 is placed on the molten pool 33. The melt 31 and the molten pool 33 are integrated together and solidified to form the bead 61 joined to the substrate 17. The additive manufacturing apparatus 100 continues to feed the wire 5 for a predetermined feed time after starting to feed the wire 5 to the machining area 34. The additive manufacturing apparatus 100 adjusts the feed rate of the wire 5 by adjusting the rotational speed of the rotary motor 4. There is a correlation between the feed rate of the wire 5 and the laser power for achieving proper welding of the melt 31. On the basis of such a correlation, the feed rate of the wire 5 is limited to a certain level by the laser power.

Increasing the laser power of the laser oscillator 2 can shorten the time required for forming the bead 61. Note that when the feed rate of the wire 5 is too fast for the laser power, the wire 5 remains unmelted. Also, when the feed rate of the wire 5 is slow for the laser power, the wire 5 is excessively heated so that a droplet, which is the melt 31, falls from the wire 5. When the droplet falls, the melt 31 may solidify into a shape different from a desired shape of the bead 61. The additive manufacturing apparatus 100 properly adjusts the feed rate of the wire 5 to thereby prevent the situation where the wire 5 remains unmelted or the situation where the droplet falls.

The size of the bead 61 is adjusted by changing at least one of the feed time of the wire 5, the irradiation time for continuing the irradiation with the laser beam 24, and the amount of movement of the laser beam 24. The additive manufacturing apparatus 100 increases the feed time of the wire 5, increases the irradiation time with the laser beam 24, or increases the amount of movement of the laser beam 24, thereby increasing the diameter of the bead 61 that is formed. The additive manufacturing apparatus 100 reduces the feed time of the wire 5, reduces the irradiation time with the laser beam 24, or reduces the amount of movement of the laser beam 24, thereby reducing the diameter of the bead 61 that is formed. In addition, the additive manufacturing apparatus 100 can adjust the shape of the bead 61 by appropriately adjusting the amount of movement of the laser beam 24. The additive manufacturing apparatus 100 can adjust the shape of the bead 61 to be circular or elliptical.

Figure 23:
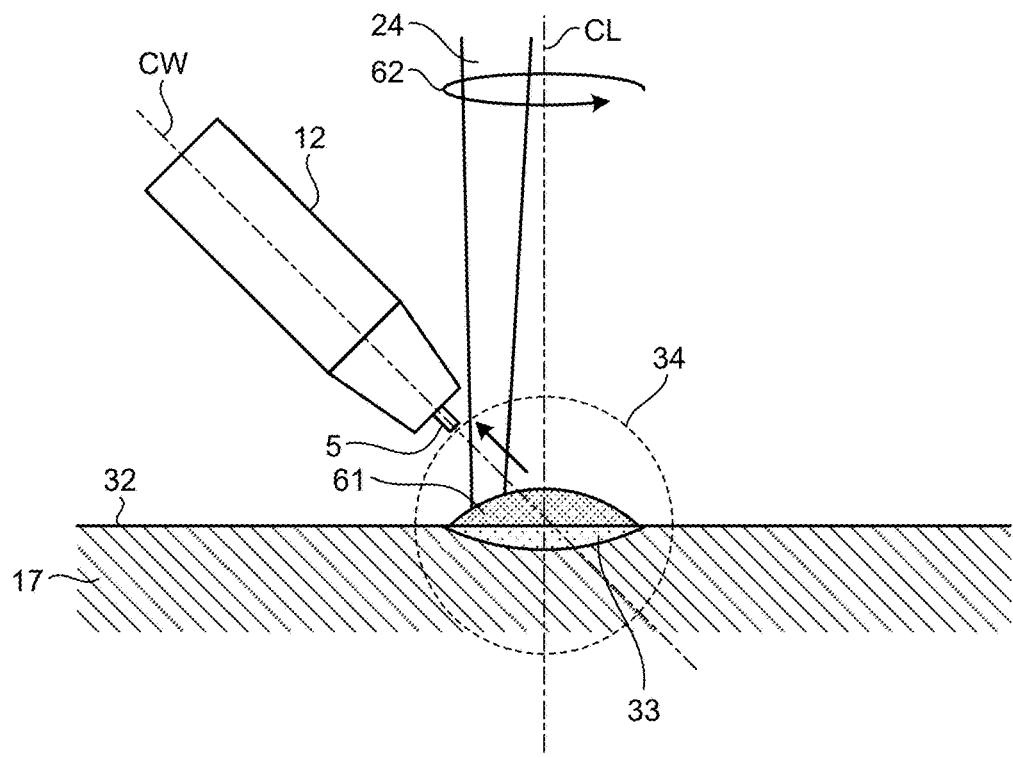
FIG. 23 is a diagram for explaining a fifth step of forming the ball bead by the additive manufacturing apparatus according to the fifth embodiment.

FIG. 23 is a diagram for explaining a fifth step of forming the ball bead by the additive manufacturing apparatus 100 according to the fifth embodiment. The additive manufacturing apparatus 100 withdraws the wire 5 from the machining area 34 after the melt 31 in an amount necessary for forming the bead 61 is placed on the molten pool 33.

Figure 24:
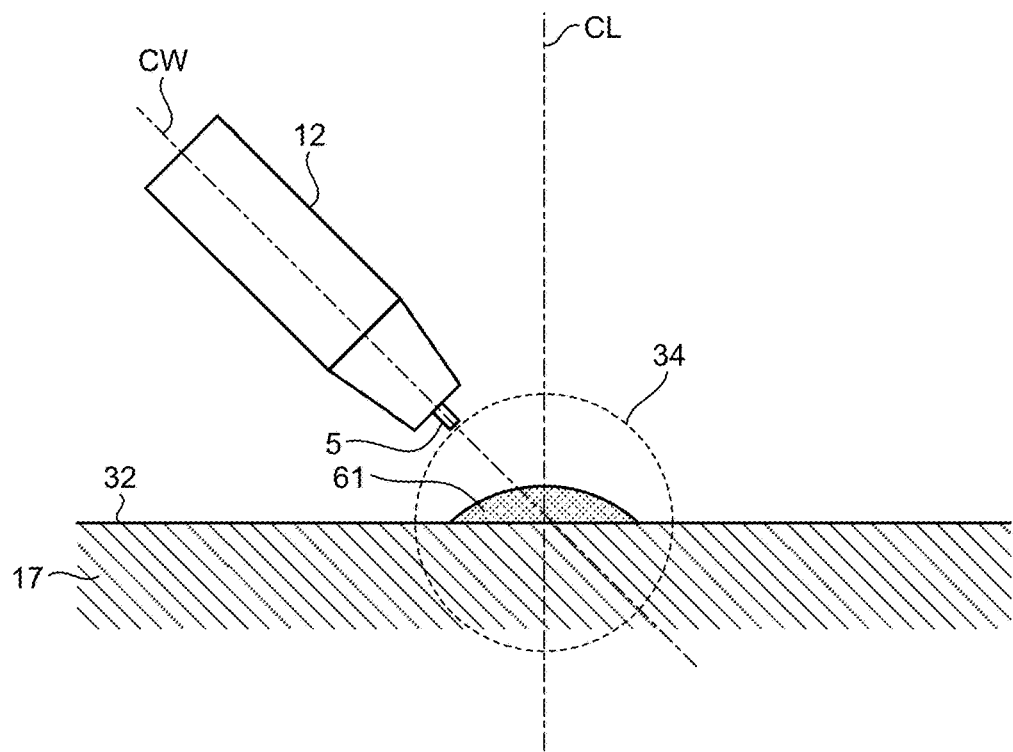
FIG. 24 is a diagram for explaining a sixth step of forming the ball bead by the additive manufacturing apparatus according to the fifth embodiment.

FIG. 24 is a diagram for explaining a sixth step of forming the ball bead by the additive manufacturing apparatus 100 according to the fifth embodiment. The additive manufacturing apparatus 100 stops the emission of the laser beam 24 toward the machining area 34. After stopping the emission of the laser beam 24, the additive manufacturing apparatus 100 continues the ejection of the inert gas 25 for a predetermined time. The duration of continued ejection of the inert gas 25 is a time required to lower the temperature of the bead 61 to a predetermined temperature. The duration is determined on the basis of various conditions such as the material of the wire 5 or the size of the bead 61. Information on the duration is stored in advance in the controller 1. After stopping the emission of the laser beam 24, the additive manufacturing apparatus 100 stops the ejection of the inert gas 25 after the duration has elapsed. This completes the formation of one piece of the bead 61.

Figure 25:
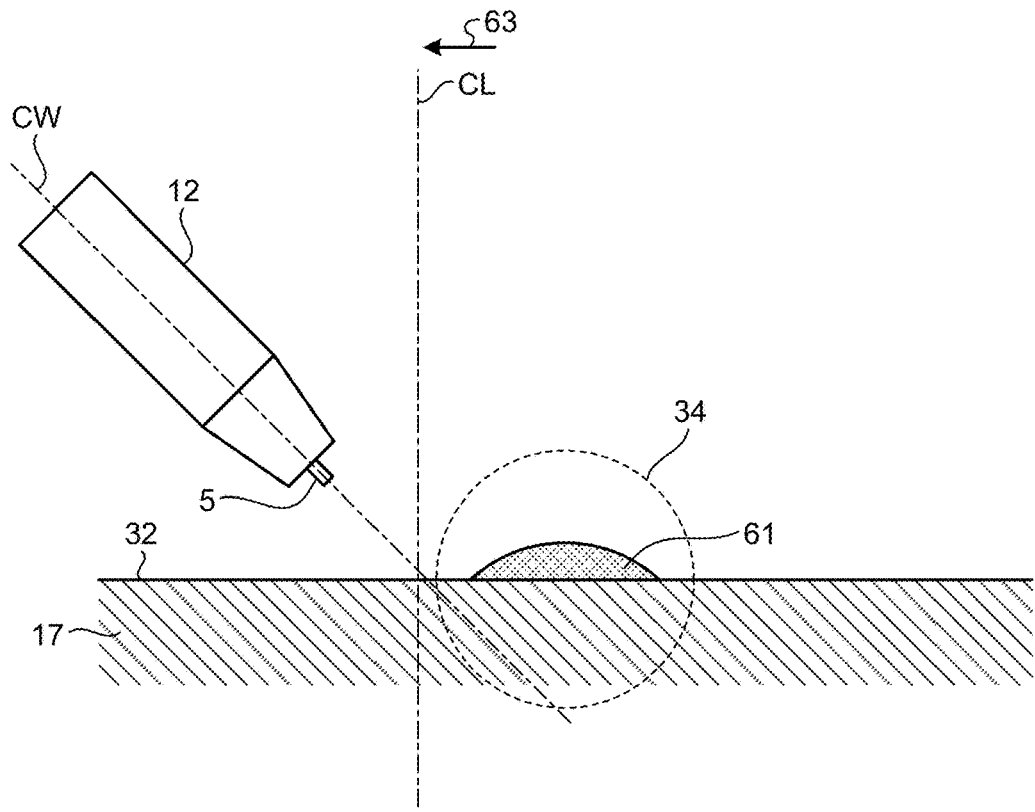
FIG. 25 is a diagram for explaining a seventh step of forming the ball bead by the additive manufacturing apparatus according to the fifth embodiment.

FIG. 25 is a diagram for explaining a seventh step of forming the ball bead by the additive manufacturing apparatus 100 according to the fifth embodiment. The additive manufacturing apparatus 100 moves the machining head 10 to the next machining point. The arrow 63 illustrated in FIG. 25 indicates the direction of travel of the machining head 10. The additive manufacturing apparatus 100 forms the object by repeating the first step to the seventh step.

Note that, in the second step and the third step described above, the wire 5 is sent from the wire nozzle 12 to the machining area 34, and then the laser beam 24 is emitted toward the machining area 34. The additive manufacturing apparatus 100 may emit the laser beam 24 toward the machining area 34 and then send the wire 5 from the wire nozzle 12 to the machining area 34.

Figure 26:
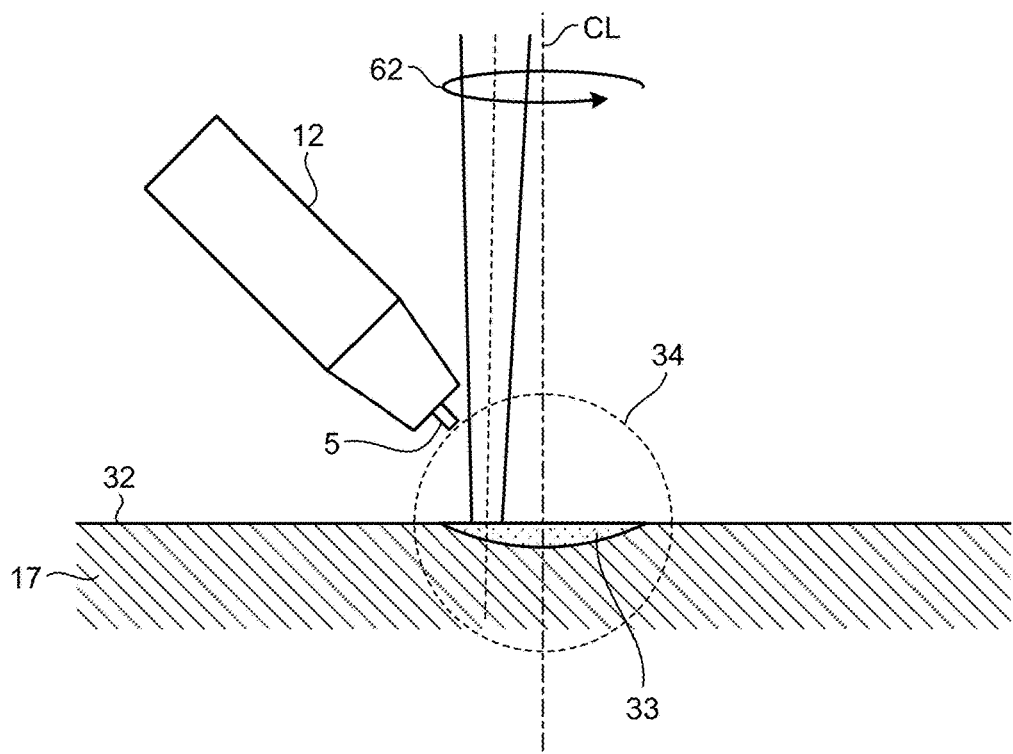
FIG. 26 is a diagram for explaining an eighth step of forming the ball bead by the additive manufacturing apparatus according to the fifth embodiment.
Figure 27:
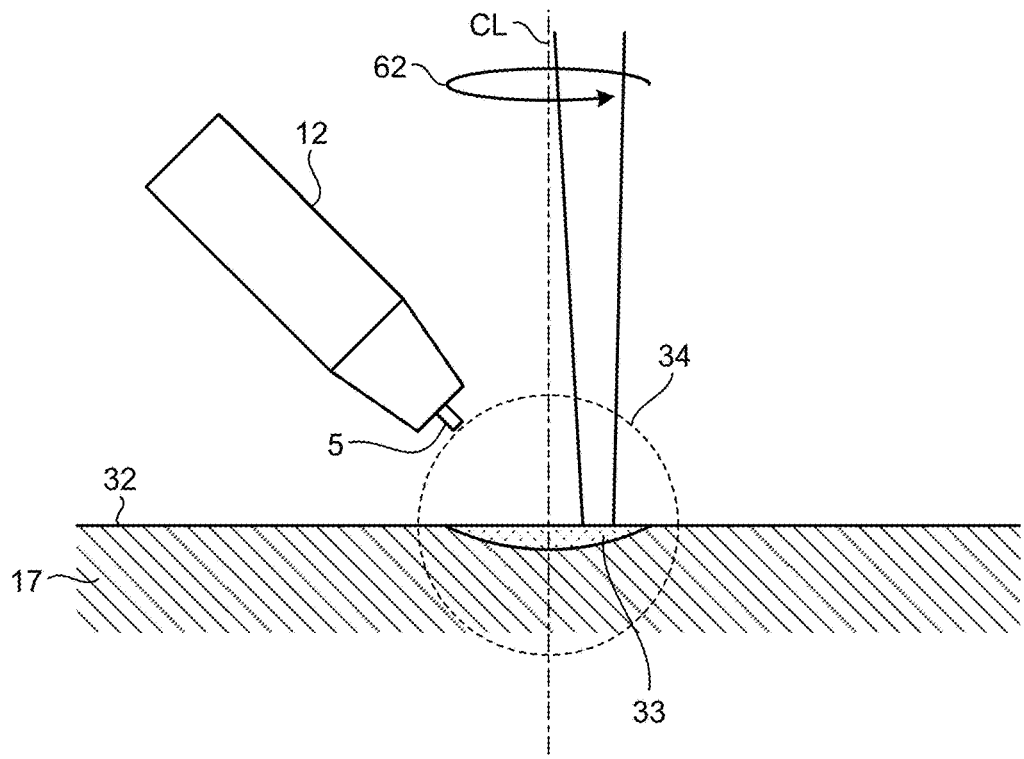
FIG. 27 is a diagram for explaining a ninth step of forming the ball bead by the additive manufacturing apparatus according to the fifth embodiment.
Figure 28:
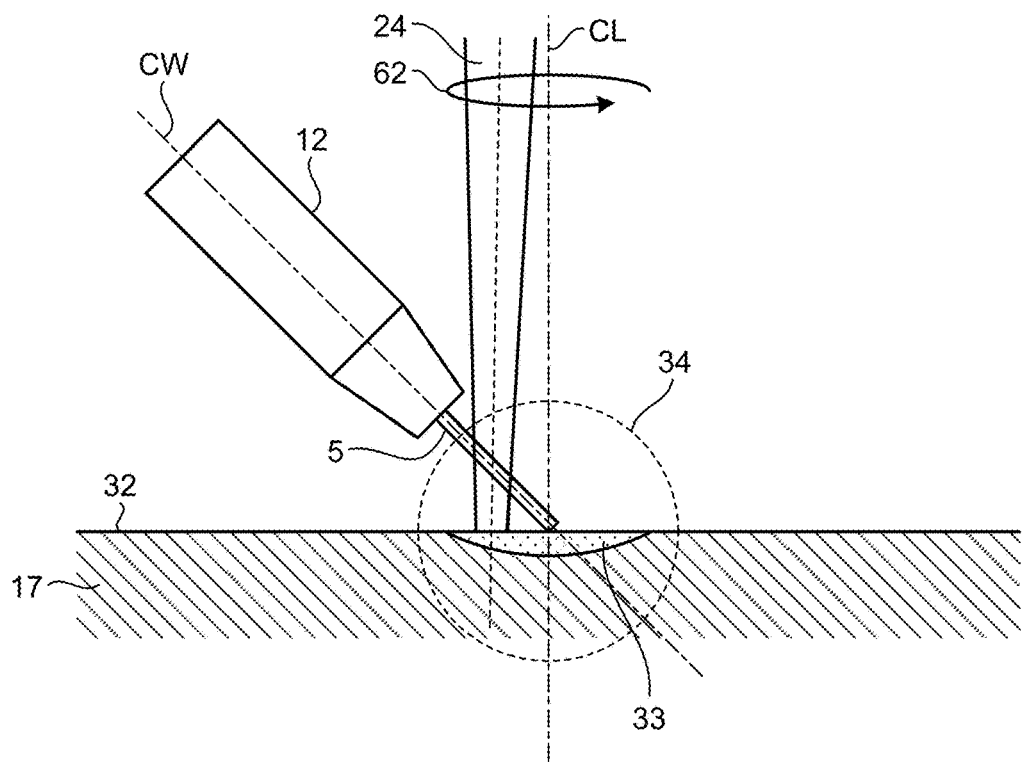
FIG. 28 is a diagram for explaining a tenth step of forming the ball bead by the additive manufacturing apparatus according to the fifth embodiment.

FIG. 26 is a diagram for explaining an eighth step of forming the ball bead by the additive manufacturing apparatus 100 according to the fifth embodiment. FIG. 27 is a diagram for explaining a ninth step of forming the ball bead by the additive manufacturing apparatus 100 according to the fifth embodiment. FIG. 28 is a diagram for explaining a tenth step of forming the ball bead by the additive manufacturing apparatus 100 according to the fifth embodiment. The additive manufacturing apparatus 100 may perform the eighth step to the tenth step instead of the second step and the third step described above.

In the eighth step, as illustrated in FIG. 26, the additive manufacturing apparatus 100 emits the laser beam 24 toward the machining area 34. In the ninth step, as illustrated in FIG. 27, the additive manufacturing apparatus 100 moves the laser beam 24. The beam drive unit 20 moves the laser beam 24 in the irradiation area 64 or 66. The additive manufacturing apparatus 100 thus moves the laser beam 24 from the state illustrated in FIG. 26.

Then in the tenth step, as illustrated in FIG. 28, the additive manufacturing apparatus 100 sends the wire 5 from the wire nozzle 12 to the machining area 34 and brings the tip portion of the wire 5 into contact with the surface 32 of the substrate 17. Upon completing the tenth step, the additive manufacturing apparatus 100 performs the operation according to the procedure in the fourth step and subsequent steps described above.

Through the eighth step to the tenth step, the additive manufacturing apparatus 100 emits the laser beam 24 and moves the laser beam 24 in the irradiation area 64 or 66, and then sends the wire 5 to the machining area 34. In this case, the additive manufacturing apparatus 100 starts sending the wire 5 after forming the molten pool 33 on the surface 32.

According to the fifth embodiment, the additive manufacturing apparatus 100 moves the laser beam 24 in the irradiation area 64 or 66 when forming the ball bead. The additive manufacturing apparatus 100 can form the object with the ball bead having any desired shape. The additive manufacturing apparatus 100 can perform highly accurate building by forming the object with the ball bead having any desired shape.

Note that, in the fifth embodiment, the path in which the laser beam 24 is moved by the beam drive unit 20 is set as appropriate, whereby the irradiation areas 64 and 66 can have any desired shapes. Also in the fifth embodiment, the controller 1 may determine, on the basis of the direction of travel of the tip portion of the wire 5, the direction in which the laser beam 24 is moved by the beam drive unit 20. The controller 1 may determine, on the basis of the direction of travel, the orientations of the irradiation areas 64 and 66 or the shapes of the irradiation areas 64 and 66. The beam drive unit 20 may vary the sizes of the irradiation areas 64 and 66 at different positions on the reference plane of the workpiece.

The additive manufacturing apparatus 100 according to the fifth embodiment is not limited to forming the entire object with the ball bead. The additive manufacturing apparatus 100 according to the fifth embodiment need only form the ball bead included in the object in at least a part of the object when manufacturing the object by adding the material melted by irradiation with the laser beam 24 to the workpiece.

Next, a hardware configuration for implementing the controller 1 according to the first to fifth embodiments will be described. The controller 1 is implemented by processing circuitry. The processing circuitry may be a circuit in which a processor executes software, or may be a dedicated circuit.

Figure 29:
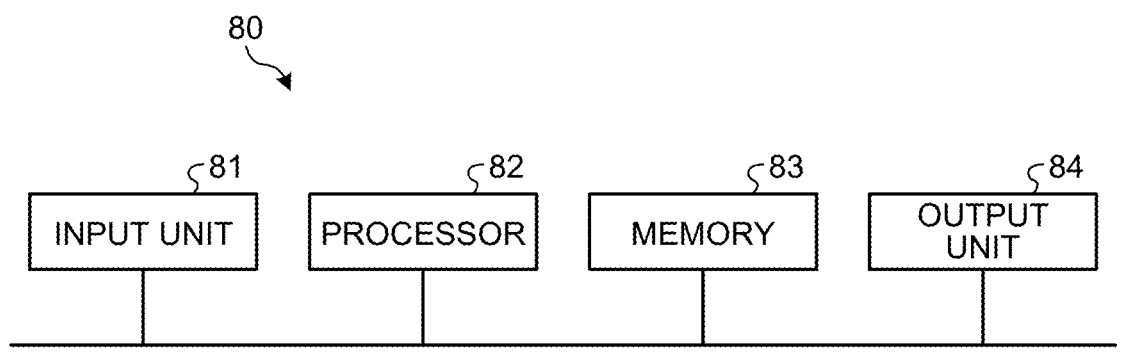
FIG. 29 is a diagram illustrating an example of a configuration of a control circuit according to the first to fifth embodiments.

In the case where the processing circuitry is implemented by the software, the processing circuitry is, for example, a control circuit 80 illustrated in FIG. 29. FIG. 29 is a diagram illustrating an example of a configuration of the control circuit 80 according to the first to fifth embodiments. The control circuit 80 includes an input unit 81, a processor 82, a memory 83, and an output unit 84.

The input unit 81 is an interface circuit that receives data input from the outside of the control circuit 80 and gives the data to the processor 82. The output unit 84 is an interface circuit that sends data from the processor 82 or the memory 83 to the outside of the control circuit 80. In the case where the processing circuitry is the control circuit 80 illustrated in FIG. 29, the functions of the controller 1 are implemented by the processor 82 reading and executing a program stored in the memory 83. The memory 83 is also used as a temporary memory for each processing executed by the processor 82.

The processor 82 is a central processing unit (CPU), which is also referred to as a central processor, a processing unit, an arithmetic unit, a microprocessor, a microcomputer, a processor, or a digital signal processor (DSP). The memory 83 corresponds to, for example, a non-volatile or volatile semiconductor memory such as a random access memory (RAN), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

Figure 30:
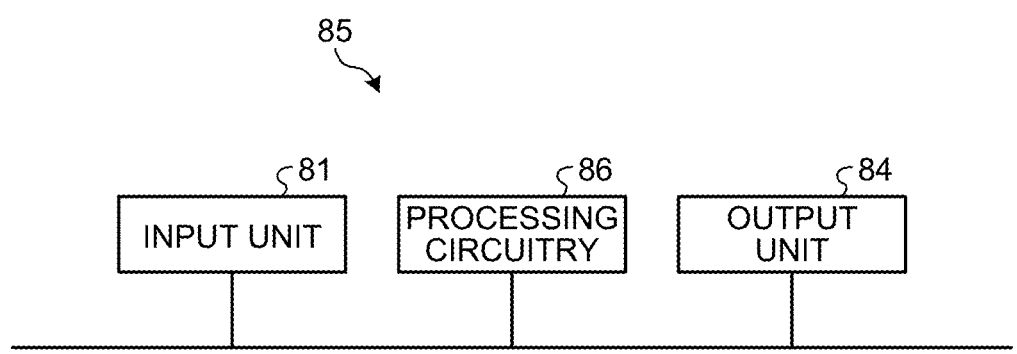
FIG. 30 is a diagram illustrating an example of a configuration of a dedicated hardware circuit according to the first to fifth embodiments.

FIG. 29 is an example of hardware in the case where the controller 1 is implemented by the processor 82 and the memory 83 that are for general purpose use, but the controller 1 may be implemented by a dedicated hardware circuit. FIG. 30 is a diagram illustrating an example of a configuration of a hardware circuit 85 that is dedicated according to the first to fifth embodiments.

The hardware circuit 85 that is dedicated includes the input unit 81, the output unit 84, and processing circuitry 86. The processing circuitry 86 is a single circuit, a complex circuit, a programmed processor, a parallel-programmed processor, an application specific integrated circuit (ASIC), a field programmable gate array (FPGA), or a circuit obtained by combining these. Note that the controller 1 may be implemented by combining the control circuit 80 and the hardware circuit 85.

The configurations illustrated in the above embodiments each illustrate an example of the content of the present disclosure. The configurations of the embodiments can be combined with another known technique. The configurations of the embodiments may be combined together as appropriate. A part of the configurations of the embodiments can be omitted or modified without departing from the scope of the present disclosure.

REFERENCE SIGNS LIST 1 controller; 2 laser oscillator; 3 fiber cable; 4 rotary motor; 5 wire; 6 wire spool; 7 gas supply device; 8 pipe; 10 machining head; 11 beam nozzle; 12 wire nozzle; 13 gas nozzle; 14 head drive unit; 15 stage; 16 rotation mechanism; 17 substrate; 18 deposit; 19 material feed unit; 20 beam drive unit; 21 hot wire power supply; 22 current cable; 23 insulator; 24 laser beam; 25 inert gas; 31 melt; 32 surface; 33 molten pool; 34 machining area; 35, 51, 52, 57, 58, 61 bead; 36, 37, 39, 41, 53, 54, 56, 62, 63, 65, 67 arrow; 38, 42 spot; 40, 43, 44, 55, 64, 66 irradiation area; 80 control circuit; 81 input unit; 82 processor; 83 memory; 84 output unit; 85 hardware circuit; 86 processing circuitry; 100 additive manufacturing apparatus; CL, CW central axis.

The invention claimed is:

1. An additive manufacturing apparatus that manufactures an object by adding a wire melted by irradiation with a beam to a workpiece, the additive manufacturing apparatus comprising:
   a machining head;
   a beam nozzle integrated with the machining head to allow the beam emitted from the machining head to pass therethrough;

a material feeder integrated with the machining head and including a wire nozzle to feed the wire to the workpiece;

a first driver to move the machining head, the beam nozzle, and the material feeder relative to the workpiece to move a tip portion of the wire relative to the workpiece, the tip portion of the wire being on a side of the workpiece;

a second driver to move the beam relative to the beam nozzle in a direction included in a reference plane, the reference plane being a plane perpendicular to a central axis of the beam nozzle; and a controller programmed to:
 determine, based on a direction of travel of the tip portion of the wire, the direction in which the beam is moved relative to the beam nozzle by the second driver, the direction of travel of the tip portion of the wire being included in the reference plane associated with the second driver and the direction of travel of the tip portion of the wire being a direction in which the tip portion of the wire travels relative to the workpiece, and control the first driver and the second driver such that the beam is movable in a manner different from the movement of the tip portion of the wire relative to the workpiece, including:
  when the direction of travel of the tip portion of the wire is a first direction, controlling the second driver to move the beam forward with respect to the tip portion of the wire in the direction of travel of the tip portion of the wire, and
  when the direction of travel of the tip portion of the wire is a second direction that is different from the first direction, controlling the second driver to move the beam to coincide with the tip portion of the wire; and
 adjust an amount of shift of a center of the beam from the tip portion of the wire in accordance with the direction of travel of the tip portion of the wire, including:
  increasing the amount of shift of the beam from the tip portion of the wire as the direction of travel of the tip portion of the wire becomes closer to perpendicular to a central axis of the wire.

2. The additive manufacturing apparatus according to claim 1, wherein the controller is programmed to maximize the amount of shift of the beam when the direction of travel of the tip portion of the wire is perpendicular to the central axis of the wire.

3. The additive manufacturing apparatus according to claim 1, wherein the controller is programmed to gradually increase the amount of shift of the beam as the direction of travel of the tip portion of the wire changes from parallel to perpendicular to the central axis of the wire.

4. The additive manufacturing apparatus according to claim 1, wherein the controller is programmed to set the amount of shift of the beam to zero when the direction of travel of the tip portion of the wire is parallel to the central axis of the wire.

5. The additive manufacturing apparatus according to claim 1, wherein the direction of travel of the tip portion of the wire is the second direction when direction of travel of the tip portion of the wire is 0° or 180° relative to a positive x-direction.

6. The additive manufacturing apparatus according to claim 1, wherein the direction of travel of the tip portion of the wire is the first direction when direction of travel of the tip portion of the wire is other than 0° and 180° relative to a positive x-direction.

7. The additive manufacturing apparatus according to claim 5, wherein the direction of travel of the tip portion of the wire is the first direction when direction of travel of the tip portion of the wire is other than 0° and 180° relative to the positive x-direction.

8. An additive manufacturing method comprising:
 when a wire melted by irradiation with a beam is added to a workpiece, moving the wire together with a beam nozzle through which the beam passes, to move a tip portion of the wire relative to the workpiece, the tip portion of the wire being on a side of the workpiece;
 determining, based on a direction of travel of the tip portion of the wire, a direction in which the beam is moved relative to the beam nozzle, the direction of travel of the tip portion of the wire being included in a reference plane and the direction of travel of the tip portion of the wire being a direction in which the tip portion of the wire travels relative to the workpiece, the reference plane being a plane perpendicular to a central axis of a beam nozzle through which the beam passes; and moving the beam relative to the beam nozzle to move the beam in a manner different from the movement of the tip portion of the wire relative to the workpiece, including:
  moving the beam forward with respect to the tip portion of the wire in the direction of travel of the tip portion of the wire when the direction of travel of the tip portion of the wire is a first direction, and
  moving the beam to coincide with the tip portion of the wire when the direction of travel of the tip portion of the wire is a second direction that is different from the first direction; and
 adjusting an amount of shift of a center of the beam from the tip portion of the wire in accordance with the direction of travel of the tip portion of the wire, including:
  increasing the amount of shift of the beam from the tip portion of the wire as the direction of travel of the tip portion of the wire becomes closer to perpendicular to a central axis of the wire.

* * * * *